United States Patent
Kambi Ravi et al.

(10) Patent No.: US 12,015,591 B2
(45) Date of Patent: Jun. 18, 2024

(54) REUSE OF GROUPS IN SECURITY POLICY

(71) Applicant: VMware LLC, Palo Alto, CA (US)

(72) Inventors: Kavya Kambi Ravi, Santa Clara, CA (US); Radha Popuri, Santa Clara, CA (US); Sunitha Krishna, Palo Alto, CA (US); Margaret Petrus, San Jose, CA (US); Yiwei Zhang, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 366 days.

(21) Appl. No.: 17/543,254

(22) Filed: Dec. 6, 2021

(65) Prior Publication Data
US 2023/0179571 A1 Jun. 8, 2023

(51) Int. Cl.
H04L 9/40 (2022.01)

(52) U.S. Cl.
CPC .......... H04L 63/0263 (2013.01); H04L 63/20 (2013.01)

(58) Field of Classification Search
CPC ............................ H04L 63/0263; H04L 63/20
See application file for complete search history.

(56) References Cited

U.S. PATENT DOCUMENTS

| | | |
|---|---|---|
| 5,636,128 A | 6/1997 | Sugimoto et al. |
| 7,027,411 B1 | 4/2006 | Pulsipher et al. |
| 7,065,079 B1 | 6/2006 | Patra et al. |
| 7,352,280 B1 | 4/2008 | Rockwood |
| 7,580,356 B1 | 8/2009 | Mishra et al. |
| 7,739,211 B2 | 6/2010 | Coffman et al. |
| 7,908,655 B1 | 3/2011 | Bhattacharyya et al. |
| 8,005,945 B2 | 8/2011 | Cohen et al. |
| 8,359,652 B2 | 1/2013 | Bhagwan et al. |
| 8,495,429 B2 | 7/2013 | Fu et al. |
| 8,499,348 B1 | 7/2013 | Rubin |
| 8,605,655 B1 | 12/2013 | Sahai et al. |

(Continued)

FOREIGN PATENT DOCUMENTS

| | | | |
|---|---|---|---|
| EP | 3422665 A1 * | 1/2019 | ........... G06F 21/554 |
| EP | 3716075 A1 | 9/2020 | |

(Continued)

OTHER PUBLICATIONS

Arbuthnot, Tom, "What are Thresholds for Good and Poor Network Packet Loss, Jitter and Round Trip Time for Unified Communications?", Tom Talks, May 17, 2018, 7 pages, retrieved from https://tomtalks.blog/what-are-thresholds-for-good-and-poor-network-packet-loss-jitter-and-round-trip-time-for-unified-communications/.

(Continued)

*Primary Examiner* — Darshan I Dhruv
(74) *Attorney, Agent, or Firm* — Quarles & Brady LLP

(57) ABSTRACT

Some embodiments provide a method for modifying a firewall rule of a security policy implemented in a network. The method identifies a set of compute machines to be added to a match condition for the firewall rule. The match condition is expressed using one or more groups of compute machines. The method selects a set of groups for the identified set of compute machines from a plurality of existing groups of compute machines based on a user-specified threshold indicating tolerance for inclusion of compute machines that are not in the identified set of compute machines in the selected groups. The method uses the selected set of groups for the match condition of the firewall rule.

18 Claims, 9 Drawing Sheets

(56) References Cited

U.S. PATENT DOCUMENTS

| | | |
|---|---|---|
| 8,762,957 B2 | 6/2014 | Cobb et al. |
| 9,166,997 B1 | 10/2015 | Guo et al. |
| 9,215,213 B2 * | 12/2015 | Bansal ............... H04L 63/0263 |
| 9,218,527 B2 | 12/2015 | Lakshminarayan et al. |
| 9,223,767 B1 | 12/2015 | Powell et al. |
| 9,438,560 B2 | 9/2016 | Mohanty et al. |
| 9,438,634 B1 | 9/2016 | Ross et al. |
| 9,454,444 B1 | 9/2016 | Agarwal et al. |
| 9,467,476 B1 | 10/2016 | Shieh et al. |
| 9,497,206 B2 | 11/2016 | Bernstein et al. |
| 9,578,050 B1 | 2/2017 | Barabash et al. |
| 9,680,877 B2 | 6/2017 | Duffield et al. |
| 9,699,049 B2 | 7/2017 | Gupta et al. |
| 9,767,197 B1 | 9/2017 | Agarwal et al. |
| 9,787,641 B2 | 10/2017 | Bansal et al. |
| 9,792,447 B2 | 10/2017 | Thota et al. |
| 9,838,354 B1 * | 12/2017 | Tulasi .................... H04L 63/20 |
| 9,882,713 B1 | 1/2018 | Raza et al. |
| 9,891,940 B2 | 2/2018 | Feroz et al. |
| 9,998,339 B1 | 6/2018 | Brajkovic et al. |
| 10,063,519 B1 * | 8/2018 | Zhao ................... H04L 63/0263 |
| 10,129,162 B1 | 11/2018 | Faulk, Jr. |
| 10,257,227 B1 | 4/2019 | Stickle et al. |
| 10,298,505 B1 | 5/2019 | Grant et al. |
| 10,298,619 B2 | 5/2019 | Nimmagadda et al. |
| 10,324,746 B2 | 6/2019 | Kumar et al. |
| 10,419,321 B2 | 9/2019 | Raman et al. |
| 10,425,437 B1 | 9/2019 | Bog et al. |
| 10,432,707 B2 | 10/2019 | Hosie et al. |
| 10,521,584 B1 | 12/2019 | Mehr |
| 10,581,897 B1 | 3/2020 | Natanzon et al. |
| 10,735,282 B1 | 8/2020 | Singh et al. |
| 10,812,409 B2 | 10/2020 | Tiwary et al. |
| 10,887,337 B1 | 1/2021 | Kim et al. |
| 10,911,335 B1 | 2/2021 | Mordani et al. |
| 11,057,414 B1 | 7/2021 | Giorgio et al. |
| 11,140,090 B2 | 10/2021 | Mordani et al. |
| 11,150,976 B1 | 10/2021 | Marwah et al. |
| 11,176,157 B2 | 11/2021 | Mordani et al. |
| 11,188,570 B2 | 11/2021 | Jain et al. |
| 11,269,718 B1 | 3/2022 | Chen et al. |
| 11,288,256 B2 | 3/2022 | Jain et al. |
| 11,296,960 B2 | 4/2022 | Wang et al. |
| 11,321,213 B2 | 5/2022 | Gunda et al. |
| 11,336,620 B2 * | 5/2022 | Cook .................... G06F 9/4486 |
| 11,340,931 B2 | 5/2022 | Krishna et al. |
| 11,343,262 B2 | 5/2022 | Junod et al. |
| 11,347,896 B1 | 5/2022 | Brown, Jr. et al. |
| 11,349,876 B2 | 5/2022 | Krishna et al. |
| 11,374,952 B2 | 6/2022 | Coskun et al. |
| 11,374,968 B1 | 6/2022 | Colón et al. |
| 11,398,987 B2 | 7/2022 | Jain et al. |
| 11,425,150 B1 | 8/2022 | Emanuel et al. |
| 11,436,075 B2 | 9/2022 | Jain et al. |
| 11,593,639 B1 | 2/2023 | Garg et al. |
| 11,616,708 B1 | 3/2023 | Chraim et al. |
| 11,693,688 B2 | 7/2023 | Krishna et al. |
| 11,743,135 B2 | 8/2023 | Mordani et al. |
| 2003/0120955 A1 | 6/2003 | Bartal et al. |
| 2003/0236677 A1 | 12/2003 | Casati et al. |
| 2004/0190724 A1 | 9/2004 | Dettinger et al. |
| 2005/0108444 A1 | 5/2005 | Flauaus et al. |
| 2005/0119001 A1 | 6/2005 | Watanabe |
| 2005/0262554 A1 | 11/2005 | Brooks et al. |
| 2005/0289219 A1 | 12/2005 | Nazzal |
| 2006/0085785 A1 | 4/2006 | Garrett |
| 2006/0168657 A1 | 7/2006 | Baentsch et al. |
| 2006/0174337 A1 | 8/2006 | Bernoth |
| 2006/0239203 A1 | 10/2006 | Talpade et al. |
| 2007/0011734 A1 | 1/2007 | Balakrishnan et al. |
| 2007/0016666 A1 | 1/2007 | Duffield et al. |
| 2007/0058632 A1 | 3/2007 | Back et al. |
| 2007/0147236 A1 | 6/2007 | Lee |
| 2008/0037423 A1 | 2/2008 | Singh et al. |
| 2008/0059596 A1 | 3/2008 | Ogawa |
| 2008/0196102 A1 | 8/2008 | Roesch |
| 2008/0196103 A1 | 8/2008 | Lin et al. |
| 2008/0263661 A1 | 10/2008 | Bouzida |
| 2008/0267186 A1 | 10/2008 | Boukis et al. |
| 2008/0281660 A1 | 11/2008 | Sajja et al. |
| 2008/0282335 A1 | 11/2008 | Abzarian et al. |
| 2009/0077663 A1 | 3/2009 | Sun et al. |
| 2009/0106228 A1 | 4/2009 | Weinman, Jr. |
| 2009/0300341 A1 | 12/2009 | Buehler et al. |
| 2010/0049968 A1 | 2/2010 | Dimitrakos et al. |
| 2010/0106764 A1 | 4/2010 | Chadwick et al. |
| 2010/0107085 A1 | 4/2010 | Chadwick et al. |
| 2010/0153316 A1 | 6/2010 | Duffield et al. |
| 2010/0211673 A1 | 8/2010 | Kosbab et al. |
| 2010/0241480 A1 | 9/2010 | Rokhlin et al. |
| 2010/0309812 A1 | 12/2010 | Marquez et al. |
| 2010/0325199 A1 | 12/2010 | Park et al. |
| 2010/0332262 A1 | 12/2010 | Horvitz et al. |
| 2011/0082962 A1 | 4/2011 | Horovitz et al. |
| 2011/0162039 A1 | 6/2011 | Trace et al. |
| 2011/0170413 A1 | 7/2011 | Shi et al. |
| 2012/0131591 A1 | 5/2012 | Moorthi et al. |
| 2012/0226808 A1 | 9/2012 | Morgan |
| 2012/0266231 A1 | 10/2012 | Spiers et al. |
| 2013/0041522 A1 | 2/2013 | Mori et al. |
| 2013/0067090 A1 | 3/2013 | Batrouni et al. |
| 2013/0085914 A1 | 4/2013 | Mcpherson et al. |
| 2013/0117567 A1 | 5/2013 | Chang et al. |
| 2013/0124753 A1 | 5/2013 | Ansari et al. |
| 2013/0185413 A1 | 7/2013 | Beaty et al. |
| 2013/0198459 A1 | 8/2013 | Joshi et al. |
| 2013/0212255 A1 | 8/2013 | Chao et al. |
| 2013/0227687 A1 | 8/2013 | Lee |
| 2013/0254766 A1 | 9/2013 | Zuo et al. |
| 2013/0297768 A1 | 11/2013 | Singh |
| 2014/0019964 A1 | 1/2014 | Neuse et al. |
| 2014/0075564 A1 | 3/2014 | Singla et al. |
| 2014/0089506 A1 | 3/2014 | Naga et al. |
| 2014/0207918 A1 | 7/2014 | Kowalski et al. |
| 2014/0230008 A1 | 8/2014 | Feroz et al. |
| 2014/0245423 A1 | 8/2014 | Lee |
| 2014/0282591 A1 | 9/2014 | Stich et al. |
| 2014/0310513 A1 | 10/2014 | Barney et al. |
| 2015/0113529 A1 | 4/2015 | Zhong |
| 2015/0124608 A1 | 5/2015 | Agarwal et al. |
| 2015/0135003 A1 | 5/2015 | Cota-Robles et al. |
| 2015/0156214 A1 | 6/2015 | Kaminsky |
| 2015/0180892 A1 | 6/2015 | Balderas |
| 2015/0181394 A1 | 6/2015 | Zuniga et al. |
| 2015/0207813 A1 | 7/2015 | Reybok et al. |
| 2015/0281056 A1 | 10/2015 | Liljenstolpe |
| 2015/0281065 A1 | 10/2015 | Liljenstolpe |
| 2015/0286783 A1 | 10/2015 | Kumar et al. |
| 2015/0304349 A1 | 10/2015 | Bernstein et al. |
| 2015/0355957 A1 | 12/2015 | Steiner et al. |
| 2015/0358391 A1 | 12/2015 | Moon et al. |
| 2016/0050589 A1 | 2/2016 | Safavi |
| 2016/0080404 A1 | 3/2016 | Kohout et al. |
| 2016/0087847 A1 | 3/2016 | Krithivas et al. |
| 2016/0087859 A1 | 3/2016 | Kuan et al. |
| 2016/0156591 A1 | 6/2016 | Zhou et al. |
| 2016/0191306 A1 | 6/2016 | Gasparakis et al. |
| 2016/0191413 A1 | 6/2016 | Feroz et al. |
| 2016/0191463 A1 | 6/2016 | Mohanty et al. |
| 2016/0191466 A1 * | 6/2016 | Pernicha ................. H04L 63/20 726/1 |
| 2016/0191521 A1 | 6/2016 | Feroz et al. |
| 2016/0216994 A1 | 7/2016 | Sefidcon et al. |
| 2016/0218951 A1 | 7/2016 | Vasseur et al. |
| 2016/0294800 A1 | 10/2016 | Oppenheim, Jr. et al. |
| 2016/0294987 A1 | 10/2016 | Tian et al. |
| 2016/0301603 A1 | 10/2016 | Park et al. |
| 2016/0308898 A1 | 10/2016 | Teeple et al. |
| 2016/0350683 A1 | 12/2016 | Bester et al. |
| 2016/0352765 A1 | 12/2016 | Mermoud et al. |
| 2016/0359759 A1 | 12/2016 | Singh et al. |
| 2016/0380812 A1 | 12/2016 | Chanda et al. |
| 2016/0380884 A1 | 12/2016 | Sarikaya et al. |
| 2017/0005986 A1 | 1/2017 | Bansal et al. |

(56) References Cited

U.S. PATENT DOCUMENTS

| | | |
|---|---|---|
| 2017/0078168 A1 | 3/2017 | Harris et al. |
| 2017/0126677 A1 | 5/2017 | Kumar et al. |
| 2017/0134247 A1 | 5/2017 | Hoja et al. |
| 2017/0149804 A1 | 5/2017 | Kolbitsch et al. |
| 2017/0180319 A1* | 6/2017 | Nimmagadda ..... H04L 41/0893 |
| 2017/0207968 A1 | 7/2017 | Ficken et al. |
| 2017/0212799 A1 | 7/2017 | Konireddygari |
| 2017/0214634 A1 | 7/2017 | Li |
| 2017/0223046 A1 | 8/2017 | Singh |
| 2017/0272452 A1 | 9/2017 | Kraemer et al. |
| 2017/0279687 A1 | 9/2017 | Muntés-Mulero et al. |
| 2017/0293994 A1 | 10/2017 | Li et al. |
| 2017/0324632 A1 | 11/2017 | Arora |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007005 A1 | 1/2018 | Chanda et al. |
| 2018/0007008 A1* | 1/2018 | Bansal ................ G06F 12/0813 |
| 2018/0007127 A1 | 1/2018 | Salapura et al. |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0048623 A1 | 2/2018 | Bansal et al. |
| 2018/0054456 A1 | 2/2018 | Ground et al. |
| 2018/0063164 A1 | 3/2018 | Balasubramanian et al. |
| 2018/0063178 A1 | 3/2018 | Jadhav et al. |
| 2018/0077119 A1 | 3/2018 | Fields et al. |
| 2018/0077120 A1 | 3/2018 | Baughman et al. |
| 2018/0077189 A1 | 3/2018 | Doppke et al. |
| 2018/0084034 A1 | 3/2018 | Netto et al. |
| 2018/0088964 A1 | 3/2018 | Hussain et al. |
| 2018/0091485 A1 | 3/2018 | Lee et al. |
| 2018/0101371 A1 | 4/2018 | Flanakin et al. |
| 2018/0123907 A1 | 5/2018 | Raman et al. |
| 2018/0123939 A1 | 5/2018 | Raman et al. |
| 2018/0145999 A1 | 5/2018 | Ertugrul et al. |
| 2018/0167405 A1 | 6/2018 | Comay et al. |
| 2018/0176102 A1 | 6/2018 | Bansal et al. |
| 2018/0176252 A1 | 6/2018 | Nimmagadda et al. |
| 2018/0176261 A1 | 6/2018 | Bansal et al. |
| 2018/0181423 A1 | 6/2018 | Gunda et al. |
| 2018/0181754 A1 | 6/2018 | Gunda |
| 2018/0183757 A1 | 6/2018 | Gunda et al. |
| 2018/0183759 A1 | 6/2018 | Gunda et al. |
| 2018/0183761 A1 | 6/2018 | Gunda et al. |
| 2018/0189667 A1 | 7/2018 | Tsou et al. |
| 2018/0234333 A1 | 8/2018 | Inamdar et al. |
| 2018/0248904 A1 | 8/2018 | Villella et al. |
| 2018/0270189 A1 | 9/2018 | Montenot et al. |
| 2018/0270308 A1 | 9/2018 | Shea et al. |
| 2018/0287876 A1 | 10/2018 | Strobel et al. |
| 2018/0288063 A1 | 10/2018 | Koottayi et al. |
| 2018/0295036 A1 | 10/2018 | Krishnamurthy et al. |
| 2018/0316704 A1 | 11/2018 | Durairaj et al. |
| 2018/0324199 A1 | 11/2018 | Crotinger et al. |
| 2019/0007292 A1 | 1/2019 | Nevo et al. |
| 2019/0065739 A1 | 2/2019 | Manadhata et al. |
| 2019/0065762 A1 | 2/2019 | Kim et al. |
| 2019/0075056 A1 | 3/2019 | Lu et al. |
| 2019/0138423 A1 | 5/2019 | Agerstam et al. |
| 2019/0158520 A1 | 5/2019 | DiValentin et al. |
| 2019/0163900 A1 | 5/2019 | Zhang et al. |
| 2019/0166008 A1 | 5/2019 | Gintis et al. |
| 2019/0171474 A1 | 6/2019 | Malboubi et al. |
| 2019/0180141 A1 | 6/2019 | Tiagi et al. |
| 2019/0182276 A1 | 6/2019 | Tiagi et al. |
| 2019/0182281 A1 | 6/2019 | Neil et al. |
| 2019/0199599 A1 | 6/2019 | Zavesky et al. |
| 2019/0266004 A1 | 8/2019 | Kumar et al. |
| 2019/0280949 A1 | 9/2019 | Wang et al. |
| 2019/0303562 A1 | 10/2019 | Masputra et al. |
| 2019/0319863 A1 | 10/2019 | Gupta et al. |
| 2019/0342335 A1 | 11/2019 | Ni et al. |
| 2019/0373007 A1 | 12/2019 | Salunke et al. |
| 2019/0373052 A1 | 12/2019 | Pollitt et al. |
| 2019/0379612 A1 | 12/2019 | Tiwary et al. |
| 2019/0392329 A1 | 12/2019 | Rangarajan et al. |
| 2020/0028756 A1 | 1/2020 | Hale et al. |
| 2020/0084087 A1 | 3/2020 | Sharma et al. |
| 2020/0100145 A1 | 3/2020 | Enqvist et al. |
| 2020/0128043 A1 | 4/2020 | Xie |
| 2020/0162407 A1 | 5/2020 | Tillotson |
| 2020/0167258 A1 | 5/2020 | Chattopadhyay et al. |
| 2020/0167784 A1 | 5/2020 | Kursun |
| 2020/0183947 A1 | 6/2020 | Reeve et al. |
| 2020/0193031 A1 | 6/2020 | Avraham et al. |
| 2020/0210260 A1 | 7/2020 | Prabhakar et al. |
| 2020/0244676 A1 | 7/2020 | Amit et al. |
| 2020/0310884 A1 | 10/2020 | Villalobos et al. |
| 2020/0396075 A1 | 12/2020 | Visegrady et al. |
| 2020/0396254 A1 | 12/2020 | Crabtree et al. |
| 2021/0006642 A1 | 1/2021 | He et al. |
| 2021/0026677 A1 | 1/2021 | Krishna et al. |
| 2021/0026720 A1 | 1/2021 | Jain et al. |
| 2021/0026830 A1 | 1/2021 | Jain et al. |
| 2021/0026863 A1 | 1/2021 | Mordani et al. |
| 2021/0026870 A1 | 1/2021 | Jain et al. |
| 2021/0028996 A1 | 1/2021 | Mordani et al. |
| 2021/0029002 A1 | 1/2021 | Mordani et al. |
| 2021/0029050 A1 | 1/2021 | Jain et al. |
| 2021/0029051 A1 | 1/2021 | Mordani et al. |
| 2021/0029166 A1 | 1/2021 | Krishna et al. |
| 2021/0075789 A1 | 3/2021 | Wen et al. |
| 2021/0084074 A1 | 3/2021 | Kirner et al. |
| 2021/0099473 A1 | 4/2021 | Fainberg et al. |
| 2021/0110282 A1 | 4/2021 | McCann et al. |
| 2021/0110407 A1 | 4/2021 | Albero et al. |
| 2021/0136101 A1 | 5/2021 | Ben-Yosef et al. |
| 2021/0168125 A1* | 6/2021 | Vemulpali ........... H04L 63/0263 |
| 2021/0185073 A1 | 6/2021 | Ewaida et al. |
| 2021/0185085 A1 | 6/2021 | Wang et al. |
| 2021/0203684 A1 | 7/2021 | Maor et al. |
| 2021/0218770 A1 | 7/2021 | Ben-Yosef et al. |
| 2021/0219219 A1 | 7/2021 | Sundararaj et al. |
| 2021/0224179 A1 | 7/2021 | Gunda et al. |
| 2021/0243212 A1 | 8/2021 | Bowman et al. |
| 2021/0248240 A1 | 8/2021 | Comish et al. |
| 2021/0264025 A1 | 8/2021 | Givental et al. |
| 2021/0281591 A1 | 9/2021 | Furtak |
| 2021/0344689 A1 | 11/2021 | Mehr |
| 2021/0350248 A1 | 11/2021 | Rogers et al. |
| 2021/0367842 A1 | 11/2021 | Guillou et al. |
| 2021/0367923 A1* | 11/2021 | Kaidi .................. H04L 63/1425 |
| 2022/0014560 A1 | 1/2022 | Crabtree et al. |
| 2022/0070699 A1 | 3/2022 | Thiyagarajan et al. |
| 2022/0200993 A1* | 6/2022 | Smith ..................... H04L 63/20 |
| 2022/0210126 A1* | 6/2022 | Keiser ................ G06F 9/45558 |
| 2022/0215453 A1 | 7/2022 | Achan et al. |
| 2022/0224721 A1 | 7/2022 | Bertiger et al. |
| 2022/0239675 A1 | 7/2022 | Panse et al. |
| 2022/0239683 A1 | 7/2022 | Kaliya et al. |
| 2022/0253531 A1 | 8/2022 | Kim et al. |
| 2022/0261330 A1 | 8/2022 | Gunda et al. |
| 2022/0269577 A1 | 8/2022 | Gechman et al. |
| 2022/0365806 A1 | 11/2022 | Krishna et al. |
| 2022/0385647 A1 | 12/2022 | Pabón et al. |
| 2022/0407897 A1 | 12/2022 | Raghuvanshi et al. |
| 2022/0417096 A1 | 12/2022 | Vutukuri et al. |
| 2023/0011043 A1 | 1/2023 | Panse et al. |
| 2023/0011397 A1 | 1/2023 | Panse et al. |
| 2023/0011957 A1 | 1/2023 | Panse et al. |
| 2023/0131894 A1 | 4/2023 | Panse et al. |
| 2023/0179572 A1 | 6/2023 | Ravi et al. |

FOREIGN PATENT DOCUMENTS

| | | |
|---|---|---|
| EP | 3767553 A1 | 1/2021 |
| WO | 2006091175 A1 | 8/2006 |
| WO | 2016003262 A1 | 1/2016 |

(56) References Cited

OTHER PUBLICATIONS

Abbes, Tarek, et al., "Detection of Firewall Configuration Errors with Updatable Tree," International Journal of Information Security, May 2015, 17 pages, vol. 15, No. 3, Springer Verlag.

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

Non-Published Commonly Owned U.S. Appl. No. 17/220,550, filed Apr. 1, 2021, 54 pages, VMware, Inc.

Non-Published Commonly Owned U.S. Appl. No. 17/220,553, filed Apr. 1, 2021, 55 pages, VMware, Inc.

Non-Published Commonly Owned U.S. Appl. No. 17/355,829, filed Jun. 23, 2021, 44 pages, VMware, Inc.

Non-Published Commonly Owned U.S. Appl. No. 17/372,264, filed Jul. 9, 2021, 52 pages, VMware, Inc.

Non-Published Commonly Owned U.S. Appl. No. 17/372,268, filed Jul. 9, 2021, 53 pages, VMware, Inc.

Non-Published Commonly Owned U.S. Appl. No. 17/372,271, filed Jul. 9, 2021, 53 pages, VMware, Inc.

Non-Published Commonly Owned U.S. Appl. No. 17/507,548, filed Oct. 21, 2021, 45 pages, VMware, Inc.

Non-Published Commonly Owned U.S. Appl. No. 17/543,294, filed Dec. 6, 2021, 49 pages, VMware, Inc.

Oliveira, Ricardo M., et al., "Automatic Detection of Firewall Misconfigurations Using Firewall and Network Routing Policies," Jan. 2009, 6 pages.

Ring, Markus, et al., "Detection of Slow Port Scans in Flow-Based Network Traffic," PLOS ONE, Sep. 25, 2018, 18 pages, retrieved from https://journals.plos.org/plosone/article?id=10.1371/journal.pone.0204507.

Turcotte, Melissa J. M., et al., "Unified Host and Network Data Set", Aug. 24, 2017, 16 pages, arXiv:1708.07518v1, arXiv.org, Cornell University, Ithaca, NY, USA.

Waye, Lucas, et al., "Cryptographically Secure Information Flow Control on Key-Value Stores," CCS '17: Proceedings of the 2017 ACM SIGSAC Conference on Computer and Communications Security, Oct. 30-Nov. 3, 2017, 15 pages, ACM, Dallas, TX, USA.

Non-Published Commonly Owned U.S. Appl. No. 18/211,402, filed Jun. 19, 2023, 102 pages, VMware, Inc.

Non-Published Commonly Owned U.S. Appl. No. 18/226,771, filed Jul. 27, 2023, 94 pages, VMware, Inc.

\* cited by examiner

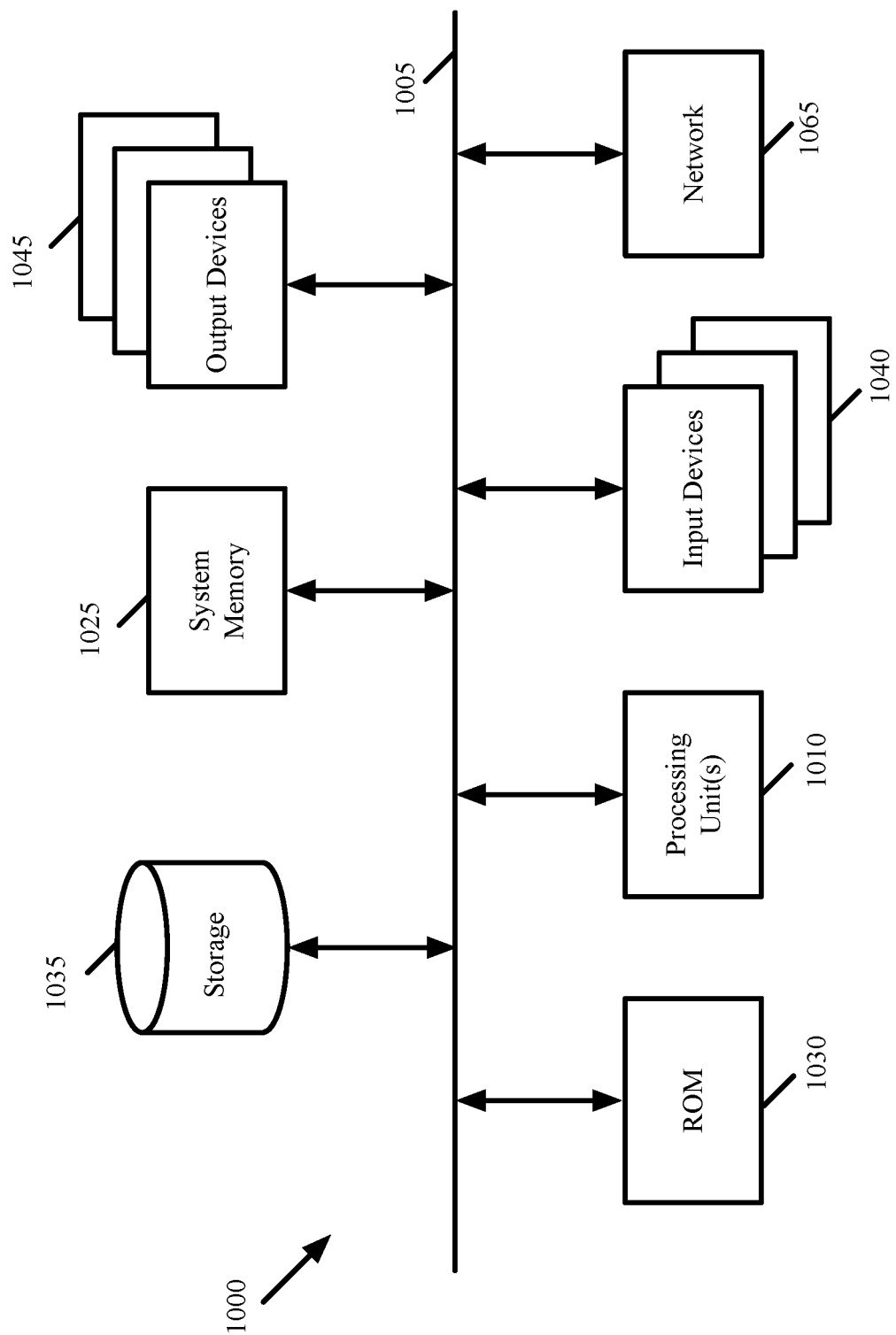

REUSE OF GROUPS IN SECURITY POLICY

BACKGROUND

Micro-segmentation techniques allow a system to observe flows in a network and generate recommended security policies for a network (or a portion of that network, e.g., relating to a particular application). This works well for a network that does not have existing policies. However, if an administrator, consultant, or other entity has previously written policies for the network, generating a new policy that respects these existing policies is more complicated and has traditionally needed to be done manually. However, for a large network with many network endpoints and many flows, manual updating of policies can be extremely time-consuming, so automated techniques for updating policies is needed.

BRIEF SUMMARY

Some embodiments provide a network analysis appliance that automatically updates (or automatically provides recommendations for updating) an existing security policy (e.g., a set of firewall rules) implemented in a network based on observed flows, while respecting the rules in the existing policy. Based on the set of existing firewall rules and a set of flows observed in the network that do not match the firewall rules (e.g., flows that are allowed based on a default rule, also referred to as "leaks"), the analysis appliance identifies an optimized set of modifications to the set of firewall rules to generate a set of modified firewall rules. The modified set of firewall rules has the property that (i) any flows that matched firewall rules allowing traffic in the set of existing firewall rules still match firewall rules allowing traffic in the modified firewall rules and (ii) any flows in the set of observed flows also match firewall rules allowing traffic in the modified firewall rules.

In some embodiments, the security policy being updated is a security policy for a particular application, as defined by an administrator or other user. The application definition specifies a set of machines (e.g., a set of web servers, a set of database servers, a combination of web servers and database servers, or another group of machines that collectively implement the application) and in some embodiments the security policy specifies types of traffic that are allowed to be sent to the machines of the application (or a subset of the machines), from the machines of the application (or a subset of the machines), and between the machines of the application (or between subsets of the machines), as well as the machines and/or network addresses that the machines of the application are allowed to communicate with. This security policy is expressed as a set of firewall rules.

Each "allow" firewall rule (i.e., a rule specifying a type of traffic that is allowed by the security policy) includes a set of match conditions having one or more source groups, one or more destination groups, and a set of one or more services. The source groups for a rule map to a set of source addresses associated with the rule, the destination groups map to a set of destination addresses associated with the rule, and each service maps to a transport layer protocol (e.g., TCP, UDP, etc.) and a transport layer port number (i.e., corresponding to a particular application layer service, such as port 80 for http). Flows are allowed by a particular firewall rule if the source address (e.g., source IP address) of the flow matches one of the source addresses associated with the rule, the destination address of the flow matches one of the destination addresses associated with the rule, and the transport layer protocol and port number (e.g., destination port number) of the flow match the protocol and port number associated with the rule.

To generate the modifications to the set of existing firewall rules based on a set of observed flows that do not match the firewall rules (that are sent to, from, or between the machines of the application), the analysis appliance first separates the flows into different types of flows: intra-application flows, ingress flows, and egress flows. Intra-application flows are between two machines that are part of the application, ingress flows are flows sent from sources outside the application to machines of the application, and egress flows are flows sent from machines of the application to destinations outside of the application. In general, the rule modification process maps intra-application flows to intra-application rules (i.e., rules for which both the associated source and destination addresses are associated with the application), ingress flows to ingress rules (i.e., rules for which the associated destination addresses are associated with the application), and egress flows to egress rules (i.e., rules for which the associated source addresses are associated with the application).

For each flow in the set of flows (the leaks), the analysis appliance identifies a closest matching firewall rule in the corresponding set of existing firewall rules (i.e., in the intra-application, ingress, or egress rules). There should not be any firewall rule that is a perfect match (source, destination, and service) because the flow would have matched that firewall rule in the network and thus not appeared as a leak. However, different embodiments may use different variations to determine which firewall rule is the closest to a match.

First, some embodiments identify any rules for the service on which the flow is communicating (i.e., rules for which the flow matches the protocol and port number). If there are no such matching rules, then some embodiments create a new rule. If there is only one rule for which the flow matches the protocol and port number, then this rule is designated as the closest matching rule for the flow.

If multiple rules are found for which the flow matches the protocol and port number, then preference is given to any such rules for which one of the source and destination addresses of the flow matches the source or destination addresses associated with the rule, as compared to rules for which neither the source nor destination addresses of the flow matches the source or destination addresses associated with the rule. If multiple rules still remain as possibilities, then the rule with the highest priority (e.g., the lowest sequence number, assuming that lower sequence numbers indicate higher priorities) is selected as the closest matching rule. This process is performed for each of the flows in some embodiments to identify the closest matching rule for each flow.

Any of the firewall rules that are identified as a closest matching rule for at least one flow are identified for modification, with the non-matching source and/or destination addresses of the corresponding flows added to the associated source and destination address sets for the flow. In some embodiments, new groups are created (or recommended for creation) to include the newly-added addresses. Other embodiments perform a group selection process to determine existing groups that should be added to the source and/or destination match conditions for each rule.

Specifically, for each rule that is identified for modification (any rule identified as a closest matching rule for one or more flows), some embodiments use an optimization problem driven by user-specified settings to determine an optimal set of groups to add to the source and/or destination match conditions. For a given match condition of the rule (i.e., either source or destination match condition), the optimization problem identifies a set of compute machines to be added to the match condition (i.e., the set of compute machines corresponding to the addresses of the flows for which the rule is a closest matching rule) and selects a set of groups from existing groups to encompass this identified set of compute machines.

The selection of the set of groups is based, in part, on a user-specified threshold that indicates tolerance for the inclusion of compute machines that are not in the identified set of compute machines in the selected groups. This threshold balances the desire to use existing groups (as opposed to creating new groups for every rule modification) against the inclusion in the match condition of additional compute machines that are not part of the set of compute machines identified for addition to the match condition. In some embodiments, the higher the threshold, the more of the compute machines in the group that need to be part of the set of compute machines identified for addition to the match condition. Specifically, in some embodiments, the threshold specifies a minimum percentage of the compute machines in a group that are required to be in the set of compute machines identified for addition to the match condition. Groups falling below the threshold are not considered as candidates for inclusion in the set of selected set of groups.

In some embodiments, the selection process, after identifying candidate groups with the percentage of compute machines that are in the identified set for addition above the user-specified threshold, orders these based on this percentage (with the groups having the highest percentage first). Ties in percentage are broken based on the number of compute machines in the identified set for addition that are in the group. Based on this ordering, the process selects groups (in order) that include at least one compute machine in the identified set of compute machines that has not yet been included in a selected group, until all compute machines in the identified set are included in at least one group. Some embodiments also create new groups for any compute machines that are not included in any of the selected groups.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 10 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network analysis appliance that automatically updates (or automatically provides recommendations for updating) an existing security policy (e.g., a set of firewall rules) implemented in a network based on observed flows, while respecting the rules in the existing policy. Based on the set of existing firewall rules and a set of flows observed in the network that do not match the firewall rules (e.g., flows that are allowed based on a default rule, also referred to as "leaks"), the analysis appliance identifies an optimized set of modifications to the set of firewall rules to generate a set of modified firewall rules. The modified set of firewall rules has the property that (i) any flows that matched firewall rules allowing traffic in the set of existing firewall rules still match firewall rules allowing traffic in the modified firewall rules and (ii) any flows in the set of observed flows also match firewall rules allowing traffic in the modified firewall rules.

To identify the observed flows, some embodiments leverage a data flow collection system for the datacenter that collects and reports attributes of data flows associated with compute machines executing in the datacenter (e.g., virtual machines (VMs), containers, bare metal computing devices, etc.). Agents on host computers (or operating directly on bare metal computing devices) collect and export data flow information for the compute machines, also referred to as data compute nodes (DCNs) to the analysis appliance (which may operate, e.g., as a single server or cluster of servers). Agents on the host computers (e.g., different agents than those that export the data flow information) also export context information to the analysis appliance.

Figure 1:
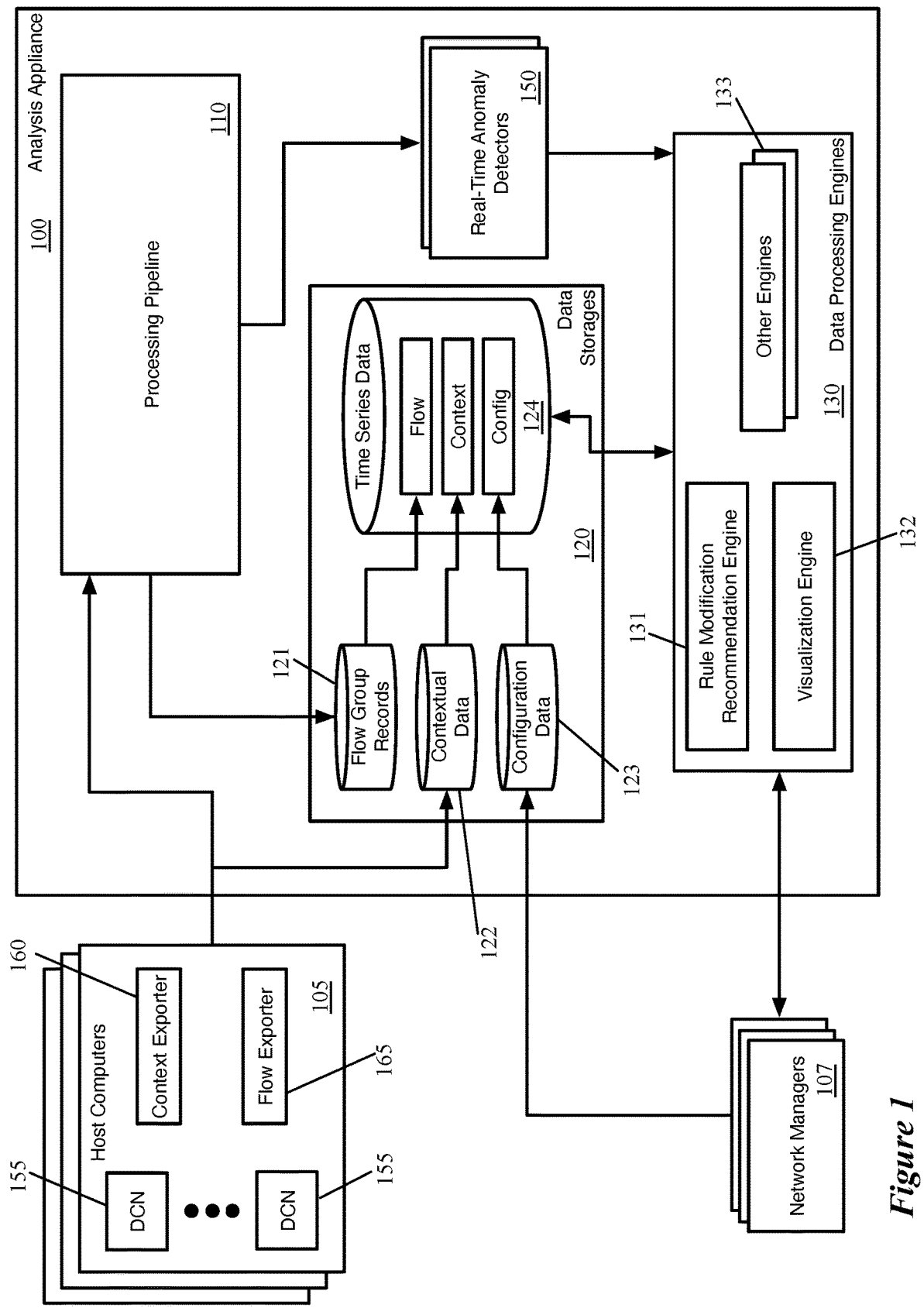
FIG. 1 conceptually illustrates an analysis appliance of some embodiments.

FIG. 1 conceptually illustrates the analysis appliance 100 of some embodiments, as well as network managers 107 and host computers 105. The analysis appliance 100 includes a processing pipeline 110 for flow data (e.g., flow attribute sets received from host computers), a set of data storages 120 for storing received data, a set of real-time anomaly detectors 150 for performing regular anomaly detection on incoming flow data from the processing pipeline 110, and a set of data processing engines 130 (e.g., a rule modification engine 131, a visualization engine 132, and other engines 133).

The host computers 105 will be described in greater detail below by reference to FIG. 2. As shown, these host computers execute one or more DCNs 155 (e.g., virtual machines (VMs), containers, etc.) that can run services, applications, etc. These DCNs 155 send and receive data traffic, which are organized as data message flows. Each host computer 105 also executes (e.g., within virtualization software) a context exporter 160 and a flow exporter 165, which are associated with the analysis appliance 100. The context exporter 160 collects context data regarding the DCNs 155 and provides this data to the analysis appliance 100. The flow exporter 165 collects information about data flows to and from the DCNs 155 and provides this data to the analysis appliance 100.

The network managers 107 provide configuration data to the analysis appliance 100, including management plane configuration data and policy configuration data. In addition, the analysis appliance 100 communicates control messages (e.g., updates to service rule policies, updated keys, updated group memberships validated by a user, etc.) through the network managers 107. In some embodiments, a user (e.g., an administrator, not shown) can interact with the analysis appliance 100 directly (e.g., to initiate the security policy update, set a group use threshold value).

The processing pipeline 110, in some embodiments, processes flow data (e.g., flow attribute sets, also referred to as flow group records) received from the host computers in the system for analysis by other elements of the appliance (e.g., the anomaly detector 150). When two DCNs 155 within the datacenter communicate with each other and their respective host computers 105, both provide flow attribute sets for the flow to the analysis appliance 100. The processing pipeline 110 deduplicates these flow attribute sets (i.e., into a single flow attribute set). This deduplication process matches these flows (e.g., based on flow keys) and, in some embodiments, generates a new flow attribute set for the data flow that includes all unique attributes from both the source and destination host computer flow attribute sets. The processing pipeline 110 stores these flow attribute sets in the data storages 120 (e.g., the flow group records 121). In some embodiments, in addition to deduplication, the processing pipeline 110 also identifies and groups corresponding flow attribute sets (e.g., for reverse direction flows, or otherwise-related flows). These flow attribute sets are also combined and stored in, e.g., the flow group records 121.

The processing pipeline 110 of some embodiments also fills in missing information for flow attribute sets, if needed (e.g., DCN identifiers for remote DCNs, etc.) using other flow attribute sets or other information (e.g., by matching DCN identifiers to network addresses already present in the flow attribute sets). Correlation of flow attribute sets can again be performed after this missing information is filled in. Additional description of the processing pipeline 110 is found in U.S. Patent Publication 2021/0029050, which is incorporated herein by reference.

The data storages 120 include, in some embodiments, a data storage for each different type of data received (e.g., a correlated flow group record data storage 121, a contextual attribute data storage 122, a configuration data storage 123, and a time series data storage 124). The contextual attribute data storage 122, in some embodiments, stores received contextual attribute data from multiple host computers and uses that data for populating the time series data storage 124 with contextual attribute data (e.g., in a contextual attribute topic). In some embodiments, the contextual attribute data storage 122 is used in correlating contextual attributes with flow group records for display. The time series data storage 124 is used additionally, or alternatively, in other embodiments, for correlating contextual attribute data to flow group record data.

The contextual attribute data storage 122, in some embodiments, receives contextual attribute data sets including any, or all, of: data regarding guest metadata, guest events, and guest DCN metrics. In some embodiments, the guest metadata includes any or all of DCN details (a universally unique identifier [uuid], a bios uuid, and a vmxpath), operating system details (type of OS and version information), and process details (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. It should be understood that many additional pieces of information may be provided to a contextual attribute data storage and that the partial list above serves only as an example.

In some embodiments, the set of data storages 120 includes a flow group record data storage 121. In some embodiments, this data storage 121 stores flow attribute sets after aggregation and correlation with configuration data stored in the configuration data storage 123. The flow group record data storage 121, in some embodiments, also stores learned pairings of IP addresses and DCN identifiers. In some embodiments, the learning is based on previously processed flow record groups. The correlated flow group record data storage 121, in some embodiments, provides processed (e.g., aggregated and correlated) flow group records to the time series data storage. In some embodiments, flow group records may also indicate any firewall rules that were matched by the data messages of the flow.

The configuration data storage 123, in some embodiments, receives configuration data (e.g., management plane configuration and/or policy configuration) from a network manager controller. The management plane configuration data includes information relating to group membership (in terms of DCN), and the policy configuration data sets include information about service rules (e.g., firewall rules), in some embodiments. The service rules, in some embodiments, are expressed in terms of any of IP addresses, ports, protocols, groups (e.g., groups of compute machines or IP addresses), etc., in any combination. In some embodiments, an initial set of configuration data is sent at startup or reboot of either the network manager computer or the analysis appliance, while subsequent configuration data sets include only changes to the last configuration data set.

A time series data storage 124, in some embodiments, stores flow group records, configuration data, and context data. In some embodiments, the time series data storage 124 is organized by topic with each different type of data stored in a different topic. Additionally, in some embodiments, each topic is organized in a time series fashion by use of an index that is appended to each set of data and is coordinated among all the producers of data for the topic. The time series data storage 124 is organized at multiple levels of temporal granularity, in some embodiments. In some embodiments, the different levels of granularity include some combination of hourly, daily, weekly, and monthly. The different levels of temporal granularity are used, in some embodiments, for data collected for a previous 24 hours (e.g., organized on an hourly basis), data for a previous 6 days (e.g., organized on a daily basis), data for a previous 30 days (e.g., organized on a daily or weekly basis), and data received more than 30 days earlier (e.g., organized on a monthly basis). The data organized based on the various levels of temporal granularity are, in some embodiments, periodically (e.g., daily, hourly, etc.) rolled up into the next level of granularity.

Real-time (or near-real-time) anomaly detectors 150, in some embodiments, analyze the correlated flow attribute sets as this flow information is received and correlated by the processing pipeline 110 (as opposed to retrieving data from the storages 120). In some embodiments, the processing pipeline 110 provides the flow information (possibly also correlated to contextual attribute information) to the real-time anomaly detectors 150 as batches of flow attribute sets are correlated and processed. These anomaly detectors 150 detect various types of anomalies (e.g., port sweeps, suspicious network connections, etc.) and store records of each detected anomalous event in an anomaly storage (e.g., a database, not shown in the figure). In some embodiments, each record of an anomalous event indicates at least a start and end time for the event, one or more associated DCNs, and a description of the event. The anomaly detectors 150 also provide at least a subset of the anomalous event records (e.g., records for particular types of anomalous events) directly to the data processing engines 130.

The data processing engines 130 include a rule modification recommendation engine 131, a visualization engine 132, and a set of other engines 133. In some embodiments, these various data processing engines 130 analyze the time series data 124 to perform various types of analysis for the datacenter at regular intervals (e.g., every 10 minutes, every 30 minutes, every hour, etc.) or in response to a user request (e.g., to detect various types of anomalous events in the datacenter network, to analyze a set of micro-segmentation policies for an application implemented in the datacenter). For instance, anomaly detectors might look for anomalous amounts of dropped traffic, the presence of malicious files on a DCN, vertical port scans, password and/or hash collection taking place on a DCN, etc.

The rule modification recommendation engine 131 is one example of such a data processing engine. Upon request from a user (and specification of a particular application for which to perform analysis), the rule modification engine 131 identifies flows sent to, from, or between DCNs of the application that are not matched by existing security policy rules for the application. Based on these identified flows, the rule modification recommendation engine 131 either automatically modifies the rules or provides recommendations to the user to modify the rules. In some embodiments, the rule modification recommendation engine 131 receives an application definition and a security group use threshold from a user (e.g., either through the visualization engine 132 or through the network managers 107) in addition to the security policy, a set of existing security groups, and the flow information (e.g., from the configuration and flow data stored in the time series data 124 or directly from the network managers 107). Details of the operations of the rule modification recommendation engine 131 will be described below.

The visualization engine 132 of some embodiments generates a graphical user interface through which an administrator can interact with and control the analysis appliance 100. In some embodiments, input to the rule modification recommendation engine 131 is provided by a user (e.g., a security administrator) through the visualization engine. The other engines 133 perform various other tasks, including detection of various anomalous events. Additional information about the analysis appliance 100 can be found in U.S. Patent Publication 2021/0029050, which is incorporated by reference herein.

Figure 2:
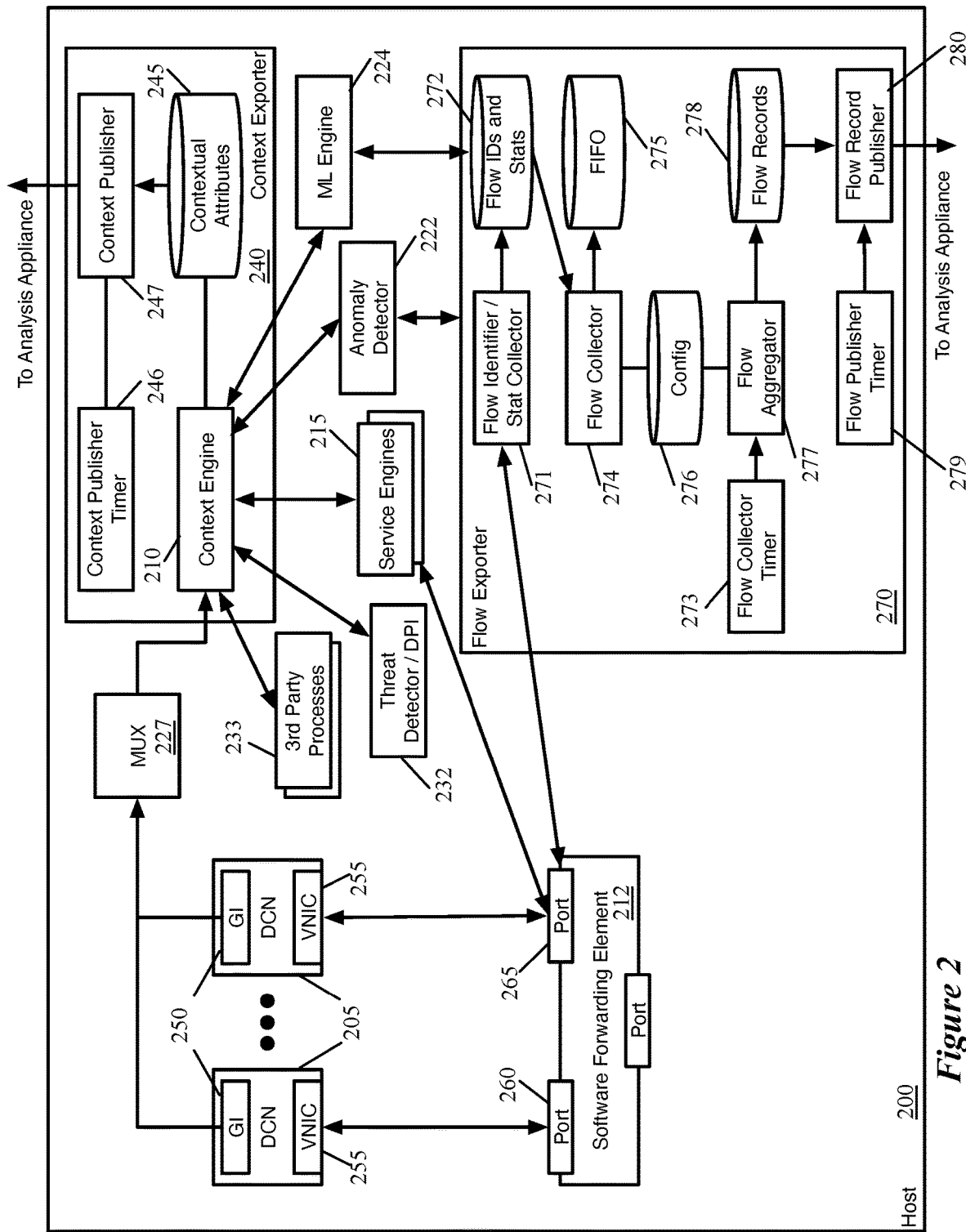
FIG. 2 conceptually illustrates a host computer of some embodiments.

FIG. 2 conceptually illustrates a host computer 200 (e.g., one of the host computers 105) of some embodiments in more detail, specifically focusing on the context exporter 240 and flow exporter 270 that collect, aggregate, and publish aggregated data to the analysis appliance. As shown, the host computer 200 also executes several data compute nodes (DCNs) 205, a set of service engines 215, a threat detector/deep packet inspection (DPI) module 232, a set of third-party processes 233, a MUX (multiplexer) 227, an anomaly detector 222, a machine learning (ML) engine 224, and a software forwarding element (SFE) 212.

Guest introspection agents 250 execute on the DCNs 205 and extract context data from the DCNs 205. For example, a guest introspection agent 250, in some embodiments, detects that a new data flow has been initiated (e.g., by sending a SYN packet in a data flow using TCP) and collects introspection data (e.g., a set of attributes of the data flow and DCN). The introspection data, in some embodiments, includes any, or all, of data regarding (i) guest metadata, (ii) guest events, and (iii) guest DCN metrics. In some embodiments, the guest metadata includes any, or all, of data regarding DCN 205 (a universally unique identifier [uuid], a bios uuid, and a vmxpath), operating system data (type of OS and version information), and process data (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. It should be understood that much of the context data, in some embodiments, is not included in L2-L7 headers of a flow and that many additional pieces of information may be collected by guest introspection agent 250. The partial list above serves only as an example of the types of information that can be gathered by guest introspection agent 250.

In some embodiments, the guest introspection agents 250 send the collected context information to the context exporter 240 (specifically to the context engine 210) through a multiplexer 227. The context exporter 240 includes the context engine 210, a contextual attribute storage 245, a context publisher timer 246, and a context publisher 247. The context exporter 240 processes context data (e.g., contextual attribute data sets) at the host computer 200 and publishes the context data to the analysis appliance. The context engine 210 also provides the received context information to other elements operating in the host computer 200 and correlates this context data with context data received from other sources.

In some embodiments, the other sources include the set of service engines 215, the threat detector/DPI module 232, third-party software (processes) 233, the anomaly detector 222, and the ML engine 224. The context engine 210, in some embodiments, correlates the context data from the multiple sources for providing the correlated context data (e.g., sets of correlated contextual attributes) to the context publisher 247 (e.g., through context attribute storage 245).

As shown, each DCN 205 also includes a virtual network interface controller (VNIC) 255 in some embodiments. Each VNIC is responsible for exchanging messages between its respective DCN and the SFE 212 (which may be, e.g., a virtual switch or a set of virtual switches). Each VNIC 255 connects to a particular port 260-265 of the SFE 212. The SFE 212 also connects to a physical network interface controller (PNIC) (not shown) of the host. In some embodiments, the VNICs are software abstractions of one or more physical NICs (PNICs) of the host created by the virtualization software of the host (within which the software forwarding element 212 executes).

In some embodiments, the SFE 212 maintains a single port 260-265 for each VNIC of each DCN. The SFE 212 connects to the host PNIC (through a NIC driver [not shown]) to send outgoing messages and to receive incoming messages. In some embodiments, the SFE 212 is defined to include one or more ports that connect to the PNIC driver to send and receive messages to and from the PNIC. The SFE 212 performs message-processing operations to forward messages that it receives on one of its ports to another one of its ports. For example, in some embodiments, the SFE 212 tries to use data in the message (e.g., data in the message header) to match a message to flow-based rules, and upon finding a match, to perform the action specified by the matching rule (e.g., to hand the message to one of its ports, which directs the message to be supplied to a destination DCN or to the PNIC).

In some embodiments, the SFE 212 is a software switch (e.g., a virtual switch), while in other embodiments it is a software router or a combined software switch/router, and may represent multiple SFEs (e.g., a combination of virtual switches and virtual routers). The SFE 212, in some embodiments, implements one or more logical forwarding elements (e.g., logical switches or logical routers) with SFEs 212 executing on other hosts in a multi-host environment. A logical forwarding element, in some embodiments, can span multiple hosts to connect DCNs that execute on different hosts but belong to one logical network. Different logical forwarding elements can be defined to specify different logical networks for different users, and each logical forwarding element can be defined by multiple software forwarding elements on multiple hosts. Each logical forwarding element isolates the traffic of the DCNs of one logical network from the DCNs of another logical network that is serviced by another logical forwarding element. A logical forwarding element can connect DCNs executing on the same host and/or different hosts, both within a datacenter and across datacenters. In some embodiments, the SFE 212 extracts from a data message a logical network identifier (e.g., a VNI) and a MAC address. The SFE 212, in such embodiments, uses the extracted VNI to identify a logical port group or logical switch, and then uses the MAC address to identify a port within the port group or logical switch.

The ports of the SFE 212, in some embodiments, include one or more function calls to one or more modules that implement special input/output (I/O) operations on incoming and outgoing messages that are received at the ports 260-265. Examples of I/O operations that are implemented by the ports 260-265 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports 260-265 can implement a chain of I/O operations on incoming and/or outgoing messages in some embodiments. Also, in some embodiments, other modules in the data path (such as the VNICs 255 and the ports 260-265, etc.) implement the I/O function call operations instead of, or in conjunction with, the ports 260-265. In some embodiments, one or more of the function calls made by the SFE ports 260-265 can be to service engines 215, which query the context engine 210 for context information that the service engines 215 use (e.g., to generate context headers that include context used in providing a service and to identify service rules applied to provide the service). In some embodiments, the generated context headers are then provided through the ports 260-265 of SFE 212 to flow exporter 270 (e.g., flow identifier and statistics collector 271).

The service engines 215 can include a distributed firewall engine of some embodiments that implements distributed firewall rules configured for the datacenter network. These distributed firewall rules are, in some embodiments, defined in terms of rule identifiers, and specify whether to drop or allow traffic from one group of DCNs to another group of DCNs. The firewall rules can be specified in terms of source and destination network addresses (e.g., IP and/or MAC addresses) and/or security groups (which are converted to network addresses). For instance, a firewall rule might be defined at the network manager level as allowing any traffic from a set of web server VMs running the Linux operating system (a first security group) to a set of database server VMs running the Windows operating system (a second security group). This firewall rule is then translated into a set of more specific rules based on the membership of the DCNs in the first and second security groups using the IP and/or MAC addresses of these DCNs.

The flow exporter 270 monitors flows, collects flow data and statistics, aggregates flow data into flow group records, and publishes flow attribute sets (also referred to as flow group records) for consumption by the analysis appliance. In some embodiments, the flow exporter 270 generally aggregates statistics for individual flows identified during multiple time periods, and for each time period identifies multiple groups of flows with each group including one or more individual flows. For each identified flow group, the flow exporter 270 identifies a set of attributes by aggregating one or more subsets of attributes of one or more individual flows in the group as described below in greater detail. In some embodiments, the subset of attributes of each individual flow in each group is the aggregated statistics of the individual flow. After the multiple time periods, flow exporter 270 provides the set of attributes for each group identified in the multiple time periods to the analysis appliance for further analysis of the identified flows.

As shown, the flow exporter 270 includes a flow identifier/statistics collector 271, a flow identifier and statistics storage 272, a flow collector timer 273, a flow collector 274, a first-in first-out (FIFO) storage 275, a configuration data storage 276, a flow aggregator 277, a flow group record storage 278, a flow publisher timer 279, and a flow group record publisher 280. These modules collectively collect and process flow data to produce and publish flow attribute sets.

The flow exporter 270 receives flow information, including flow identifiers and statistics, at the flow identifier/statistics collector 271. In some embodiments, the received flow information is derived from individual data messages that make up the flow and includes context data used in making service decisions at service engines 215. In some embodiments, the flow information also specifies which firewall rules are applied to each flow (e.g., using firewall rule identifiers). The flow exporter 270 stores the received information associated with particular flows in the flow identifier and statistics storage 272. The statistics, in some embodiments, are summarized (accumulated) over the life of the particular flow (e.g., bytes exchanged, number of packets, start time, and duration of the flow).

The flow collector 274, in some embodiments, monitors the flows to determine which flows have terminated (e.g., timeouts, FIN packets, RST packets, etc.) and collects the flow identifiers and statistics and pushes the collected data to FIFO storage 275. In some embodiments, the flow collector 274 collects additional configuration data from configuration data storage 276 and includes this additional configuration data with the data collected from flow identifier and statistics storage 272 before sending the data to FIFO storage 275.

Additionally, the flow collector 274, in some embodiments, collects data for long-lived active flows (e.g., flows lasting longer than half a publishing period) from the flow identifier and statistics storage 272 before the end of a publishing period provided by flow publisher timer 279. In some embodiments, the data collected for a long-lived active flow is different from the data collected for terminated flows. For example, active flows are reported using a start time but without a duration in some embodiments. Some embodiments also include flows that are initiated but dropped/blocked based on firewall rules.

Only flows meeting certain criteria are collected by the flow collector 274 in some embodiments. For example, only information for flows using a pre-specified set of transport layer protocols (e.g., TCP, UDP, ESP, GRE, SCTP) are collected, while others are dropped or ignored. In some embodiments, additional types of traffic, such as broadcast and multicast, safety check (e.g., having ruleID=0 or 0 rx and tx byte/packet counts), L2 flows, flows which are not classified as one of (i) inactive, (ii) drop, or (iii) reject, are dropped (i.e., not collected or not placed into FIFO storage 275).

In some embodiments, the FIFO storage 275 is a circular or ring buffer such that only a certain number of sets of flow identifiers and flow statistics can be stored before old sets are overwritten. In order to collect all the data placed into FIFO storage 275, or at least to not miss too much (e.g., miss less than 5% of the data flows), the flow aggregator 277 pulls data stored in FIFO storage 275 based on a flow collection timer 273 and aggregates the pulled data into aggregated flow group records. Some embodiments pull data from the FIFO storage 275 based on a configurable periodicity (e.g., every 10 seconds), while other embodiments, alternatively or in addition to the periodic collection, dynamically determine when to collect data from FIFO storage 275 based on a detected number of data flows (e.g., terminated data flows, a total number of active data flows, etc.) and the size of FIFO storage 275. Each set of flow data pulled from FIFO storage 275 for a particular flow, in some embodiments, represents a unidirectional flow from a first endpoint (e.g., machine or DCN) to a second endpoint. If the first and second endpoints both execute on the same host computer 200, in some embodiments, a same unidirectional flow is captured at different ports 260-265 of the software forwarding element 212. To avoid double counting a same data message provided to the flow identifier 271 from the two ports 260-265, the flow identifier 271 uses a sequence number or other unique identifier to determine if the data message has been accounted for in the statistics collected for the flow. Even if duplicate data messages for a single unidirectional flow have been accounted for, the flow aggregator 277 additionally combines sets of flow data received for the separate unidirectional flows into a single set of flow data in some embodiments. This deduplication (deduping) of flow data occurs before further aggregation in some embodiments and, in other embodiments, occurs after an aggregation operation.

The flow aggregator 277, in some embodiments, receives a set of keys from the analysis appliance through the network manager computer that specify how the flow data sets are aggregated. After aggregating the flows, the flow aggregator 277 performs a deduplication process to combine aggregated flow group records for two unidirectional flows between two DCNs 205 executing on host machine 200 into a single aggregated flow group record and stores the aggregated records in flow group record storage 278. From flow group record storage 278, flow group record publisher 280 publishes the aggregated flow group records to an analysis appliance according to a configurable timing provided by flow publisher timer 279. After publishing the aggregated flow group records (and, in some embodiments, receiving confirmation that the records were received), the records stored for the previous publishing time period are deleted and a new set of aggregated flow group records are generated.

In some embodiments, one of the flow aggregator 277 and the context engine 210 performs another correlation operation to associate the sets of correlated contextual attributes stored in contextual attribute storage 245 with the aggregated flow group records stored in the flow group record storage 278. In some embodiments, the correlation includes generating new flow attribute sets with additional attribute data included in existing attribute fields or appended in new attribute fields. In other embodiments, the sets of correlated contextual attributes and aggregated flow group records are tagged to identify related sets of aggregated flow group records and contextual attribute data. In some embodiments, the generated new flow group records are published from one of the publishers (e.g., flow group record publisher 280 or context publisher 247). In other embodiments, flow group record publisher 280 publishes the tagged aggregated flow group records and the context publisher 247 publishes the tagged sets of correlated contextual attributes.

The anomaly detection engine 222, in some embodiments, receives flow data (from any of flow identifier and statistics storage 272, FIFO storage 275, or flow group record storage 278) and context data from context engine 210 and detects, based on the received data, anomalous behavior associated with the flows. For example, based on context data identifying the application or process associated with a flow, anomaly detection engine 222 determines that the source port is not the expected source port and is flagged as anomalous. The detection, in some embodiments, includes stateful detection, stateless detection, or a combination of both. Stateless detection does not rely on previously collected data at the host, while stateful detection, in some embodiments, maintains state data related to flows and uses the state data to detect anomalous behavior. For example, a value for a mean round trip time (RTT) or other attribute of a flow and a standard deviation for that attribute may be maintained by anomaly detection engine 222 and compared to values received in a current set of flow data to determine that the value deviates from the mean value by a certain number of standard deviations that indicates an anomaly. In some embodiments, anomaly detection engine 222 appends a field to the set of context data that is one of a flag bit that indicates that an anomaly was detected or an anomaly identifier field that indicates the type of anomaly detected (e.g., a change in the status of a flow from allowed to blocked [or vice versa], a sloppy or incomplete TCP header, an application/port mismatch, or an insecure version of an application). In some embodiments, the additional context data is provided to context engine 210 separately to be correlated with the other context data received at context engine 210. As will be understood from the discussion above, the anomaly detection process may use contextual attributes not in L2-L4 headers such as data included in L7 headers and additional context values not found in headers.

In some embodiments, the anomaly detection engine 222 takes an action or generates a suggestion based on detecting the anomaly. For example, anomaly detection engine 222 can block an anomalous flow pending user review or suggest that a new firewall rule be added to a firewall configuration. In some embodiments, the anomaly detection engines 222 on each host computer 200 can report these anomalies (e.g., via the context publisher 247) to the analysis appliance for further analysis by the anomaly processing engine.

The machine learning engine 224, in some embodiments, receives flow data (from any of the flow identifier and statistics storage 272, the FIFO storage 275, and the flow group record storage 278) and context data from the context engine 210 and performs analysis on the received data. The received data (e.g., flow group records), in some embodiments, includes attributes normally recorded in a 5-tuple as well as additional L7 attributes and other contextual attributes such as user sid, process hash, URLs, appId, etc., that allow for better recommendations to be made (e.g., finer-grained firewall rules). In some embodiments, the analysis identifies possible groupings of DCNs 205 executing on the host computer 200. In some embodiments, the analysis is part of a distributed machine learning process, and the results are provided to the context engine 210 as an additional contextual attribute.

Figure 3:
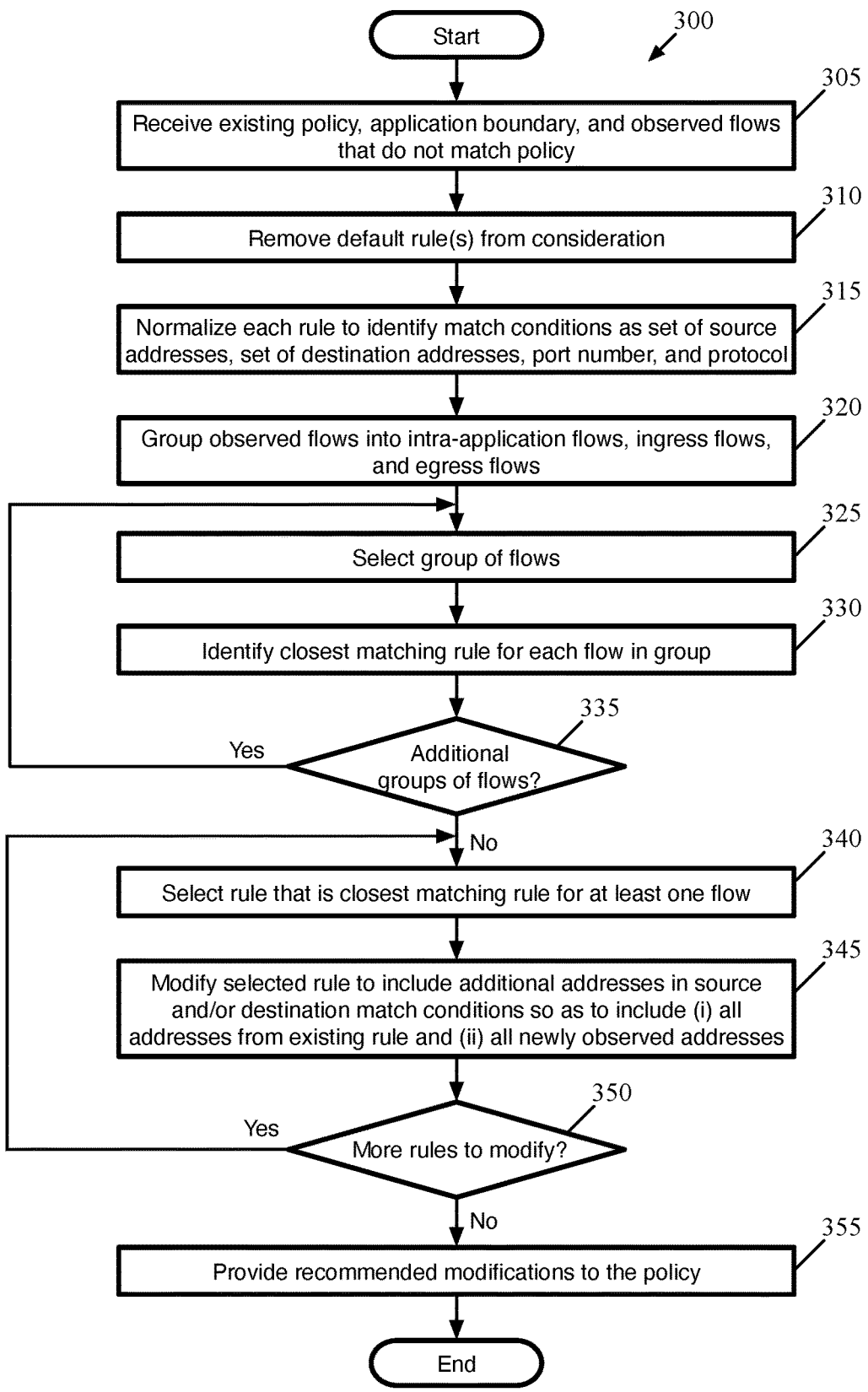
FIG. 3 conceptually illustrates a process of some embodiments for providing recommendations for an existing security policy that is implemented in a network.

FIG. 3 conceptually illustrates a process 300 of some embodiments for providing recommendations for an existing security policy that is implemented in a network. The process 300 is performed, in some embodiments, by an analysis appliance such as that shown in FIG. 1 (e.g., by rule modification recommendation engine 131). In other embodiments, however, the process 300 may be performed by a network manager or other network management and control system entity with access to security policy and flow information. In some embodiments, the process 300 is performed based on a user command specifying that the recommendation process be initiated. In other embodiments, the process 300 runs on a regular (e.g., weekly, bi-weekly) basis. The process 300 will be described in part by reference to FIG. 4, which illustrates a firewall rule and recommended modifications to the firewall rule based on a set of observed flows.

Figure 4:
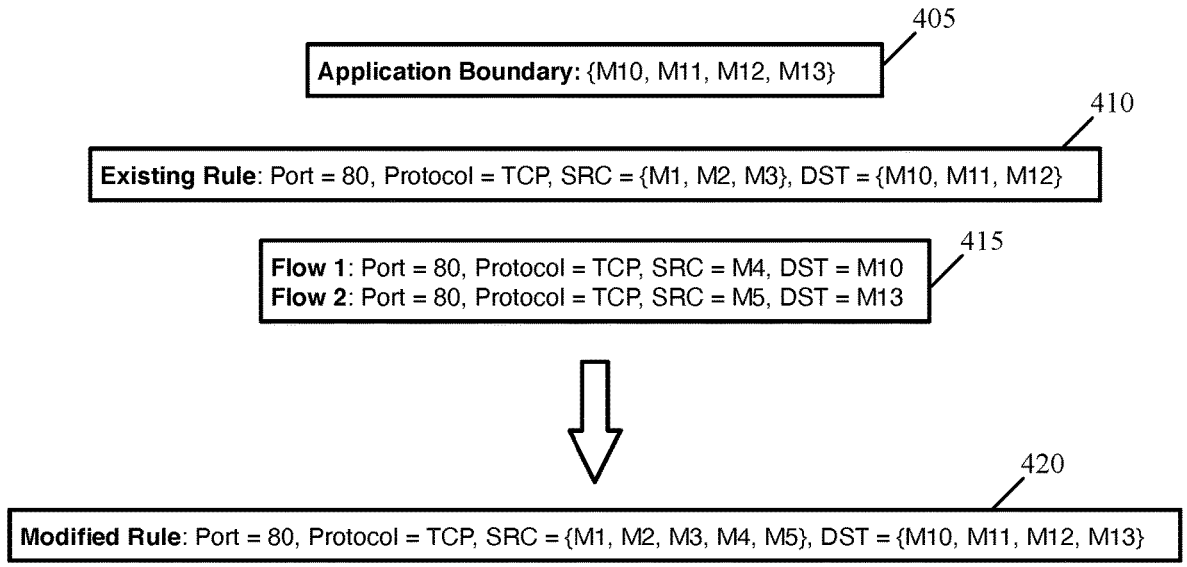
FIG. 4 illustrates a firewall rule and recommended modifications to the firewall rule based on a set of observed flows.

As shown, the process 300 begins by receiving (at 305) an existing policy, a definition of an application boundary, and a set of observed flows that do not match the policy. In some embodiments, the security policy being updated is a security policy for a particular application, as defined by an administrator or other user. The application definition specifies a set of machines (e.g., a set of web servers, a set of database servers, a combination of web servers and database servers, or another group of machines that collectively implement the application). The example shown in FIG. 4 illustrates an application boundary 405 that includes four compute machines (e.g., VMs, containers, etc.) listed as {M10, M11, M12, M13}. In different embodiments, the application boundary may be specified in terms of compute machine identifiers (i.e., identifiers used by the network management and control system), network addresses (e.g., IP addresses), or other identifiers that uniquely identify the machines.

The security policy, in some embodiments, specifies types of traffic that are allowed to be sent to the machines of the application (or a subset of the machines), from the machines of the application (or a subset of the machines), and between the machines of the application (or between subsets of the machines), as well as the machines and/or network addresses that the machines of the application are allowed to communicate with. The security policy, in some embodiments, may have been written by an administrator or security consultant or automatically generated by a microsegmentation process. This security policy is expressed as a set of firewall rules that allow traffic, block traffic, etc. In some embodiments, the security policy may include a default rule (typically the lowest priority rule) specifying that any traffic not otherwise blocked or dropped (i.e., from any source, to any destination, on any service) is allowed.

As described above, in some embodiments an analysis appliance monitors the data message flows within a network (e.g., a datacenter network). These flows can be searched to identify only flows sent to, from, or between the compute machines of the application. In addition, the flow attribute information for each of these flows indicates which firewall rules were applied in the datapath to the data messages of the flow. Through this, the system (either the rule modification recommendation engine or a separate module that provides the flow information to the rule modification recommendation engine) can identify the flows that (i) relate to the application and (ii) were allowed based on a default rule rather than a more specific rule. In addition, some embodiments remove anomalous flows (i.e., flows detected as anomalous or flows to and/or from machines that have been detected as anomalous).

Having received inputs, the process 300 removes (at 310) any default rules in the security policy from consideration. The process, in some embodiments, does not recommend removal of the default rule from the policy, but rather removes the default rule from consideration during the modification recommendation process (i.e., because the default rule does not need modification).

In addition, the process 300 normalizes (at 315) each non-default rule (or at least each non-default rule specifying a type of traffic that is allowed) of the security policy to identify the match conditions of the rule as a set of source addresses, a set of destination address, a port number (e.g., a destination transport layer port number) and a transport layer protocol. Each firewall rule includes a set of match conditions having one or more source groups, one or more destination groups, and one or more services. The firewall rule is stored in the policy using groups and services, but in the datapath these are mapped to values that can be used to match packet headers, such as network addresses, port numbers, and protocol identifiers. In addition, it should be noted that the groups of compute machines are not divided into source or destination groups in the policy; the same group may be used for the source match conditions of one rule and the destination match conditions of another rule, or even for both the source and destination match conditions of the same rule (i.e., for rules allowing a group of machines to communicate with each other).

The source groups for a rule map to a set of source addresses associated with the rule, the destination groups map to a set of destination addresses associated with the rule, and each service maps to a transport layer protocol (e.g., TCP, UDP, etc.) and a transport layer port number (i.e., corresponding to a particular application layer service, such as port 80 for http). Flows are allowed by a particular firewall rule if the source address (e.g., source IP address) of the flow matches one of the source addresses associated with the rule, the destination address of the flow matches one of the destination addresses associated with the rule, and the transport layer protocol and transport layer port number (e.g., destination port number) of the flow match the protocol and port number associated with the rule. In the example of FIG. 4, a rule 410 is shown that matches on transport layer protocol TCP and port number 80 (i.e., for http traffic), source addresses M1, M2, and M3, and destination addresses M10, M11, and M12. That is, this rule specifies certain traffic that is allowed from outside the application boundary to be sent to certain machines that implement the application.

The process 300 additionally groups (at 320) the observed flows that do not match specific rules in the policy into intra-application flows, ingress flows, and egress flows. Intra-application flows are between two machines that are part of the application, ingress flows are flows sent from sources outside the application to machines of the application, and egress flows are flows sent from machines of the application to destinations outside of the application. The analysis appliance uses the specified application boundary to identify whether any machines of the application are specified in the source field (egress flows), destination field (ingress flows), or both source and destination fields (intra-application flows) of the received flows. The example of FIG. 4 shows two ingress flows 415, both of which are http flows (TCP flows on port 80). One of these is sent from M4 to M10 and another is sent from M5 to M13. Because these flows are sent from compute machines not in the group {M1, M2, M3} (and because the destination compute machine of the second flow is not in the group {M10, M11, M12}), these flows did not match the rule 410 in the data plane of the network.

After normalizing the rules and grouping the flows, the process selects (at 325) one of the groups of flows (i.e., the ingress, egress, or intra-application flows). In general, the rule modification process maps intra-application flows to intra-application rules (i.e., rules for which both the associated source and destination addresses are associated with the application), ingress flows to ingress rules (i.e., rules for which the associated destination addresses are associated with the application), and egress flows to egress rules (i.e., rules for which the associated source addresses are associated with the application). It should be understood that the process 300 is a conceptual process, and that the analysis appliance (or other component performing the rule modification recommendation process) does not necessarily perform analysis on each group serially. For instance, some embodiments perform analysis on each of the groups in parallel.

For each flow in the selected group, the process 300 identifies (at 330) a closest matching firewall rule in the set of existing firewall rules. In general, there should not be any firewall rule that is a perfect match (source, destination, and service) because the flow would have matched that firewall rule in the network and thus not appeared as a leak. However, different embodiments may use different variations to determine which firewall rule is the closest to a match. One such process for finding the closest matching rule for a flow is described below by reference to FIG. 5. In addition, some embodiments create new rules (or recommend creation of new rules) during this process, if there is not a rule in the corresponding group for the service (port and protocol number) on which a flow is communicating. In the example of FIG. 4, the rule 410 is identified as the closest matching rule for each of the flows 415.

After identifying the closest matching rule for each flow in the group, the process 300 determines (at 335) whether additional groups of flows remain (i.e., whether the intra-application, ingress, and egress flows have all been analyzed). If additional groups, remain, the process 300 returns to 325 to select another group of flows. To the extent the groups are selected sequentially, different embodiments may select the groups in different orders.

Once all of the flows have been analyzed and the closest matching rule identified for each flow (or new rules created, if necessary), the process 300 identifies the recommended modifications for each such rule. As shown, the process 300 selects (at 340) a rule that is the closest matching rule for at least one flow. As indicated above, the process 300 is a conceptual process, and in actuality this analysis might be performed in parallel for many firewall rules.

The process 300 modifies (at 345) the selected rule to include additional addresses in the source and/or destination match conditions so as to include (i) all addresses from the existing rule and (ii) all newly observed addresses of the flows for which the selected rule was identified as the closest matching rule. FIG. 4 illustrates that the modified rule 420 now includes source address match conditions of {M1, M2, M3, M4, M5} and destination address match conditions of {M10, M11, M12, M13}. As such, both of the flows 415 would match the new recommended rule 420 in addition to any flows that would have previously matched the existing rule 410.

In some embodiments, new groups are created (or recommended for creation) to include the newly-added addresses and/or existing groups used for the rule are modified (or recommended for modification). Other embodiments perform a group selection process to determine existing groups that should be added to the source and/or destination match conditions for each rule. Specifically, for each rule that is identified for modification, some embodiments use an optimization problem driven by user-specified settings to determine an optimal set of groups to add to the source and/or destination match conditions. This group selection process is described in more detail below by reference to FIG. 7.

After modifying the selected rule, the process 300 determines (at 350) whether any rule remain to be modified (i.e., whether there are any more rules identified as the closest matching rule for one or more flows). If additional such rules remain, the process returns to 340 to select another rule and modify that rule.

Once all of the rules have been analyzed, the process 300 provides (at 355) recommended modifications (e.g., modified and new rules, new groups of compute machines) to the policy, and ends. In some embodiments, the policy is automatically modified based on these recommendations. In other embodiments, however, additional safeguards are considered before modifying the policy. For instance, some embodiments perform verification processes to ensure that the rules specified for modification have not already been modified in some way during the interim (i.e., while the process 300 is running). In addition, some embodiments present the recommended modifications to a user (e.g., a security administrator) for verification (e.g., through a graphical user interface). The user can select which modifications to accept or reject in some such embodiments.

Figure 5:
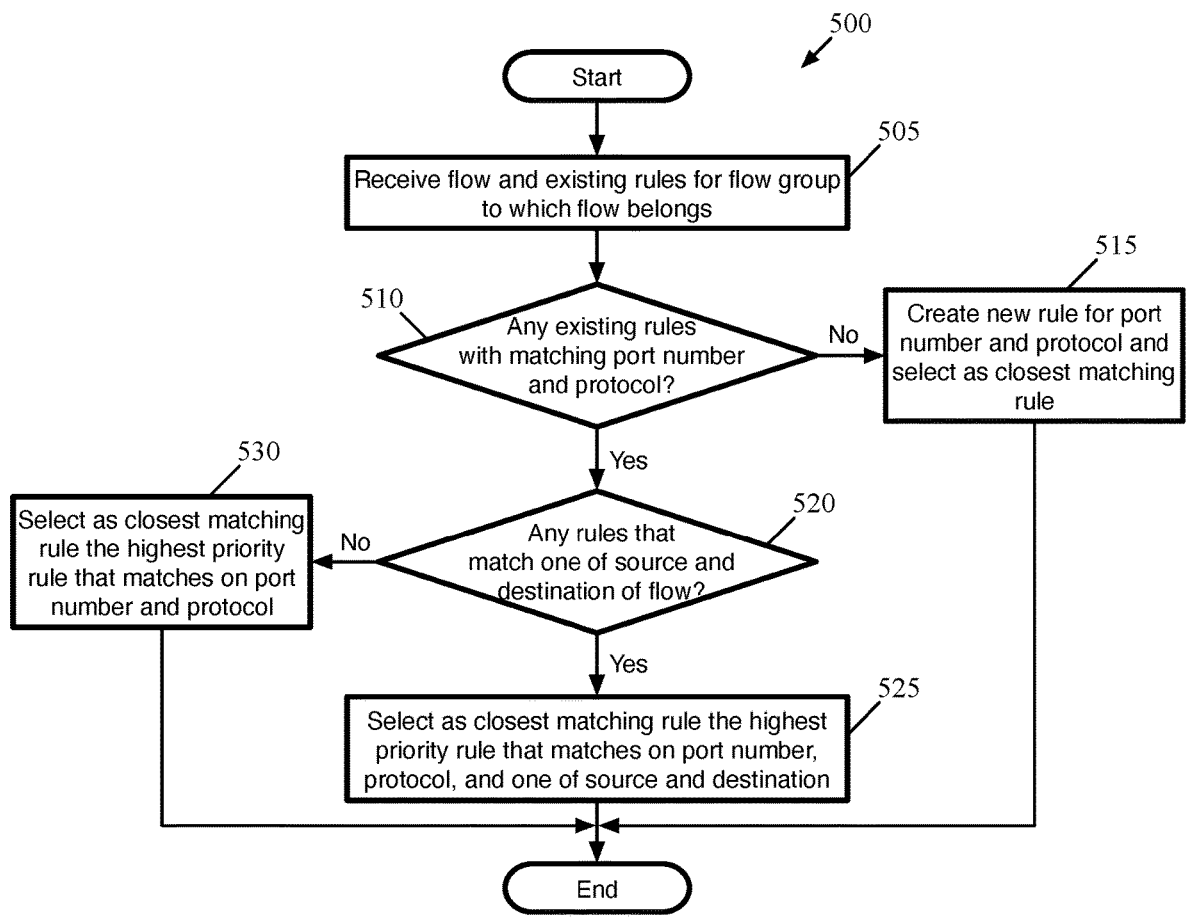
FIG. 5 conceptually illustrates a process of some embodiments for identifying the closest matching rule for a flow.

As mentioned, different embodiments may use different optimization techniques to find the closest matching rule for a given flow. FIG. 5 conceptually illustrates a process 500 of some embodiments for identifying the closest matching rule for a flow. In some embodiments, the process 500 is performed as part of a larger policy modification recommendation process (e.g., at operation 330 of the process 300). The process 500 will be described in part by reference to FIG. 6, which illustrates the identification of a closest matching rule for a flow 600.

Figure 6:
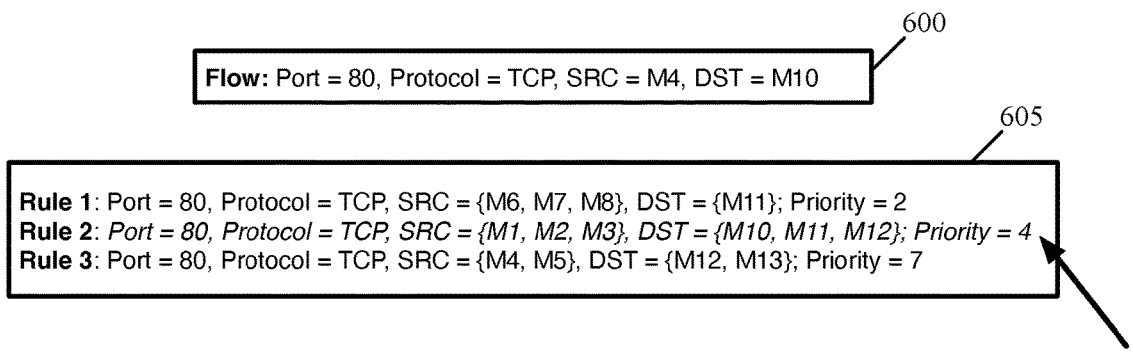
FIG. 6 illustrates the identification of a closest matching rule for a flow.

As shown, the process 500 begins by receiving (at 505) a flow and a set of existing rules for the flow group to which the flow belongs. That is, if the flow is an ingress flow, the process also receives the ingress rules; if the flow is an egress flow, the process also receives the egress rules; if the flow is an intra-application flow, the process receives the intra-application rules. As described above, in some embodiments, the process 500 is performed for each flow observed in the network (at least over a particular time period) that is sent to, from, or between compute machines of a specified application and does not match on any of the specific (microsegmented) firewall rules of the security policy for the application. In the example of FIG. 6, the flow is sent from a source M4 to a destination M10 and the service is http (protocol of TCP and port number 80). As described above by reference to FIG. 4, this is an ingress flow given the specification of the application boundary.

The process first determines (at 510) whether there are any existing rules for which the flow matches the protocol and port number. That is, the process identifies whether there are any existing rules for the service on which the flow is communicating. In general, while the source and destination addresses of rules can be modified to add additional machines/addresses, services should not be added to existing rules. In the example shown in FIG. 6, three ingress rules 605 are identified that match on port number 80 and protocol TCP (http service). The highest priority of these rules (priority number 2) matches on source addresses {M6, M7, M8} and destination addresses {M11}, the next highest priority rule (priority number 4, where lower numbers equal higher priority) matches on source addresses {M1, M2, M3} and destination addresses {M10, M11, M12}, and the lowest priority of these rules (priority number 7) matches on source addresses {M4, M5} and destination addresses {M12, M13}.

If there are no existing rules for which the flow matches the port number and protocol, the process 500 creates (at 515) a new rule for the port number and protocol and selects this as the closest matching rule, then ends. In some embodiments, the newly created rule is also eligible to be identified as the closest matching rule for subsequent flows. This way, if there are multiple flows for the same service in the same group of flows, these can be amalgamated into a single new rule rather than creating separate rules for each such flow.

If at least one rule is identified for which the flow matches the port number and protocol, the process 500 determines (at 520) whether any of these rules match one of the source and destination addresses of the flow. There should not be any rules that are a perfect match for the flow (source, destination, and service) because the flow would have matched that firewall rule in the network and thus not appeared as a leak. However, if multiple rules are found for which the flow matches the protocol and port number, then preference is given to any such rules for which one of the source and destination addresses of the flow matches the source or destination addresses associated with the rule, as compared to rules for which neither the source nor destination addresses of the flow matches the source or destination addresses associated with the rule.

If there are any rules for which the flow matches the protocol, port number, and one address, then the process 500 selects (at 525) the highest priority such rule as the closest matching rule for the flow, then ends. While highest priority is one possible tiebreaker criteria, other embodiments may use various different criteria. For instance, some embodiments prefer either source or destination matches, or (for ingress or egress flows) prefer matches on the application side as opposed to the non-application side. However, one benefit of using priority (or sequence number of the rule, which is typically inverse to priority) is that each rule in a policy has a unique priority (i.e., there are not two rules in a policy with the same priority).

If there are no rules for which the flow matches the protocol, port number, and either source or destination address, then the process 500 selects (at 530) the highest priority rule for which the flow matches the protocol and port number as the closest matching rule for the flow, then ends. Another benefit of using the priority or sequence number tiebreaker criteria is that this criterion also applies when there are no address matches. It should be noted that if there is only one rule for which the flow matches the protocol and port number, the operations 520-530 may not be performed and this single matching rule is automatically selected as the closest matching rule for the flow.

In the example of FIG. 6, the flow 600 matches all three of the rules 605 on port number and protocol. The flow 600 does not match the first rule (Rule 1) on either source or destination address side but matches the second rule (Rule 2) on the destination address side and matches the third rule (Rule 3) on the source address side. Because the second rule has a higher priority than the third rule (priority number 4 as compared to priority number 7), the second rule is selected as the closest matching rule for the flow 600 (as shown by the italics).

As indicated above, the process for modifying a rule that is identified as the closest matching rule for at least one flow involves identifying a set of groups to add to the source and/or destination match conditions of the flow. If the rules were expressed in the policy in terms of addresses, the modification process would be simple and would just involve adding the addresses from the flows to the match conditions. However, many rules may have hundreds or even thousands of compute machine addresses in the source and/or destination match conditions, and so storing the rules in terms of addresses is unwieldy. Another simplistic solution would be to simply create a group out of the addresses that need to be added to a given match condition and use that group. However, this could lead to a proliferation of groups in the policy, which would also become unnecessarily unwieldy.

Instead, some embodiments attempt to optimally reuse existing groups that are already defined in the policy. This group reuse, in some embodiments, is driven by a user-specified threshold that indicates tolerance for the inclusion of compute machines that are not in the identified set of compute machines in the selected groups. This threshold balances the desire to use existing groups (as opposed to creating new groups for every rule modification) against the inclusion in the match condition of additional compute machines that are not part of the set of compute machines identified for addition to the match condition.

Figure 7:
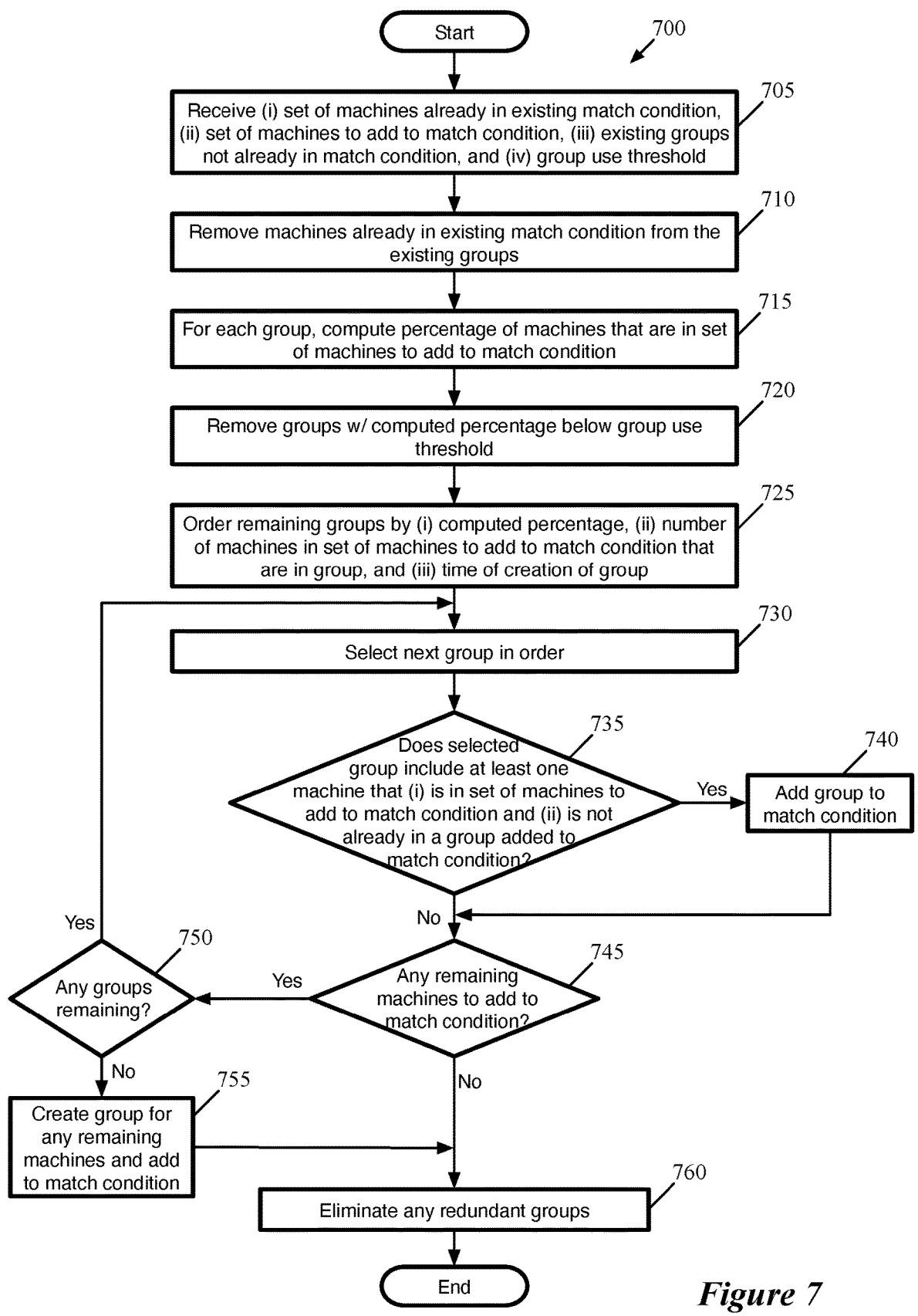
FIG. 7 conceptually illustrates a process of some embodiments for selecting a set of existing groups to add to a set of match conditions for a firewall rule.

FIG. 7 conceptually illustrates a process 700 of some embodiments for selecting a set of existing groups to add to a set of match conditions for a firewall rule. The match conditions could be either source or destination match conditions and, for some rules, both source and destination match conditions are modified (in separate iterations of the process 700). In some embodiments, the process 700 is performed as part of a larger policy modification recommendation process (e.g., at operation 345 of the process 300). This process 700 is performed, in some embodiments, for each firewall rule that is selected as the closest matching rule (e.g., by the process 500) for at least one flow (and, as noted, may be performed separately for both the source and destination match conditions of such a flow). The process 700 will be described in part by reference to FIGS. 8 and 9, which illustrate an example of selecting a set of groups to add to a set of match conditions.

As shown, the process 700 begins by receiving (at 705) (i) a set of machines (addresses) that are already in the existing match condition, (ii) a set of machines (addresses) to add to the match condition, (iii) a set of existing groups that are not already in the match condition, and (iv) a group use threshold. The set of machines already in the match condition are based on the normalization of the rule as described by reference to FIG. 3, while the set of machines to add to the match condition are based on the flows for which the current rule was identified as the closest matching rule. In some embodiments, the set of existing groups includes all groups defined within the policy that are not already used in the match condition. In some embodiments, these are pre-filtered so as to remove groups that do not include any of the machines to be added to the match condition (because such groups would not be useful).

The group use threshold is a user-specified threshold that indicates tolerance for the inclusion in the match conditions of machines that are not in either the set of machines already in the existing match condition or the set of machines to be added to the match condition. In some embodiments, as the threshold is increased more of the compute machines in a particular group are required to be part of the set of machines identified for addition to the match condition. Specifically, in some embodiments, the threshold specifies a minimum percentage of the machines in a group that are required to be in the set of machines identified for addition to the match condition in order for the group to be considered for use in the match condition. In some embodiments, the user specifies the group use threshold through a user interface mechanism, such as a slider. This user interface mechanism may be presented to the user when the user provides input to begin the policy modification recommendation process. In different embodiments, the group use threshold may be set to any value greater than 0 (and up to 100%) or may be limited to, e.g., 10% increments (e.g., 10%, 20%, . . . 100%). Setting the threshold to 100% means that no groups with compute machines outside of those that need to be added to the match condition will be selected. Some embodiments have a default group use threshold (e.g., 80%) in case the user does not provide a value.

Figure 8:
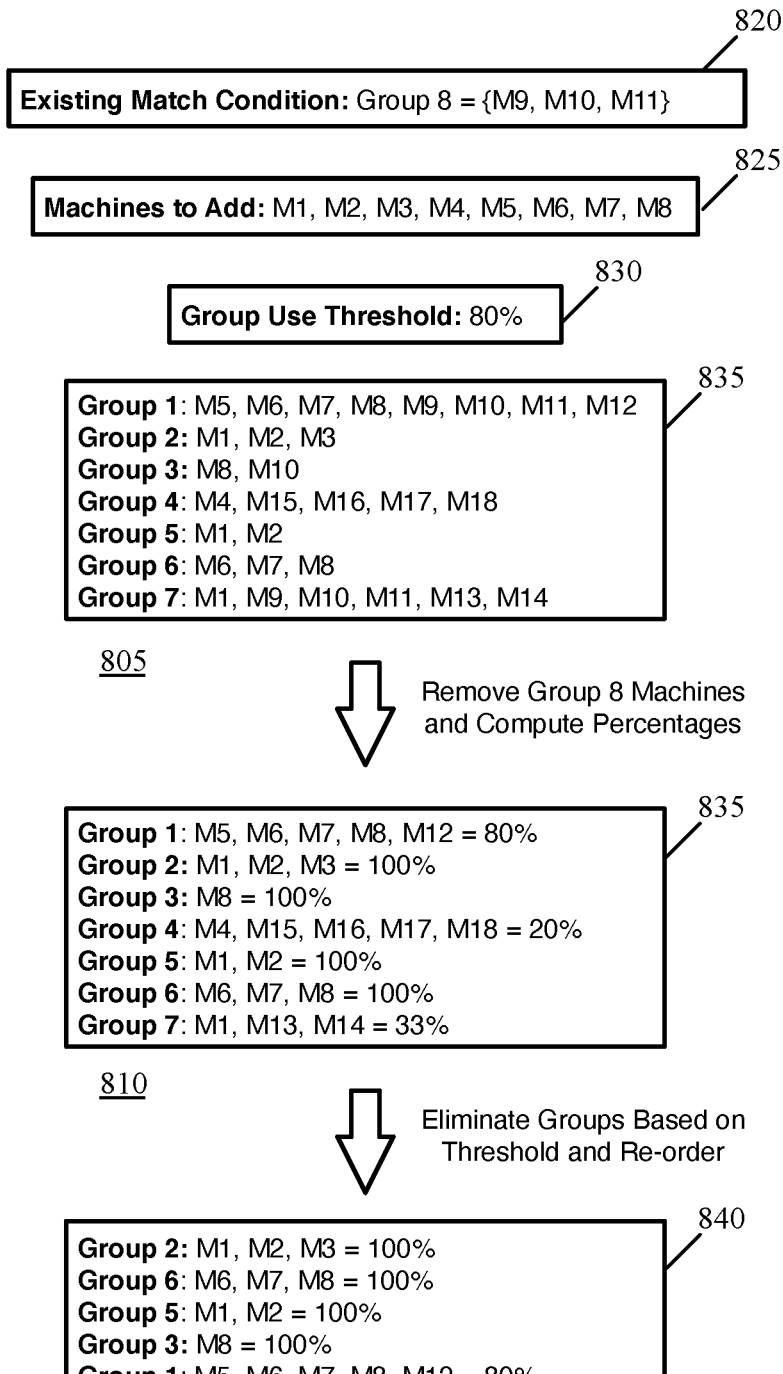
FIGS. 8 and 9 illustrate an example of selecting a set of groups to add to a set of match conditions.

FIG. 8 illustrates, in a first stage 805, an example set of inputs to the process 700. In this example, the existing match conditions 820 match on a single group (Group 8) that includes machines M9, M10, and M11, while the set 825 of machines to add to this match condition 820 based on analysis of the flows are M1, M2, M3, M4, M5, M6, M7, and M8. In addition, the group use threshold 830 is set to 80%, which is high but still allows for inclusion of some machines that are not specified for addition to the match conditions. Finally, the first stage 805 illustrates seven groups 835 that are possibilities for inclusion in the modified match conditions, with each of these groups 835 including at least one machine in the set 825 of machines to add to the match condition.

Returning to the FIG. 7, the process 700 removes (at 710) machines already in the existing match condition from the existing groups. It should be noted that this does not affect the groups as defined in the policy, as this removal is only for the consideration of group reuse. This removal prevents these machines, which can be added to the match conditions via group reuse without any consequence, from affecting decisions as to whether a group is eliminated from consideration based on the group use threshold. Other embodiments, rather than removing these machines from the existing groups, add these machines to the set of machines to be added to the match condition (while also resetting the match condition to not include any groups and moving the groups in the match condition into the set of potential groups).

After removing these machines from the existing groups, the process 700 computes (at 715), for each group, the percentage of machines left in the group that are also in the set of machines to add to the match condition (also referred to as a group match ratio). The second stage 810 of FIG. 8 illustrates each of the groups 835 with their respective group match ratios computed. The first group (Group 1) has had three of its members removed and now has a group match ratio of 80%. Groups 2, 5, and 6 have group match ratios of 100% with no removal of any members, while Group 3 has a group match ratio of 100% after removal of one of its two members. Group 4 has no members removed but only one member out of five in the set 825 of machines to add to the match conditions for a group match ratio of 20%. Finally, Group 7 has three members removed such that its group match ratio is only 33%.

The process 700 then removes (at 720) any groups with a computed group match ratio below the specified group use threshold. Removal of these groups prevents the use of groups with an unacceptably high percentage (as determined by the user-specified group use threshold) of machines that are not in the set of machines to be added to the match condition.

Next, the process 700 orders (at 725) the remaining groups (i.e., those groups that have not been removed). Some embodiments use group match ratio as the primary ordering criteria, followed by the absolute number of machines in the group that are in the set of machines to be added to the match condition. That is, a first group with six out of its eight machines in the set of machines to be added to the match condition will be ordered ahead of a second group with three out of its four machines to be added to the match conditions, but behind a third group with both of its two machines to be added to the match conditions. Other embodiments order groups with fewer machines that are not in the set of machines to be added to the match condition ahead of groups with more such machines (assuming the groups are tied on group match ratio). In case of the need for additional tiebreakers, some embodiments use group creation time (e.g., preferring more recent or less recent creation times).

The third stage 815 of FIG. 8 illustrates the remaining re-ordered groups 840 after (i) removal of groups with group match ratios below the group use threshold and (ii) ordering of the groups. Group 4 and Group 7 have been eliminated because these groups have group match ratios of 20% and 33%, below the group use threshold of 80%. Groups 2, 6, 5, and 3 all have group match ratios of 100%: Group 2 in this example has a more recent creation time than Group 6 and therefore is ranked first. Group 5 only has two members, while Group 3 has a single member, and thus these groups are ranked third and fourth. Finally, Group 1 has five members, but the group match ratio is only 80% and is thus ranked last of the remaining groups.

With the groups ordered, the process 700 iterates through the groups to determine whether each group should be added to the match condition. As shown, the process 700 selects (at 730) the next group in the order (i.e., starting with the first group) and determines whether to add this group to the match condition.

Specifically, the process 700 determines (at 735) whether the selected group includes at least one machine that (i) is in the set of machines to be added to the match condition and (ii) is not already in a group that has been added to the match condition. Some embodiments implement this by using a data structure that starts with the entire set of machines to be added to the match condition and removes machines from this data structure whenever a group including the machine is added to the match condition.

When the selected group meets these criteria, the process 700 adds (at 740) the group to the match condition (i.e., to the list of groups recommended to be added to the match condition). Based on these criteria, the first group in the order will always be added to the match condition, because it will have at least one machine to be added and that machine could not have already been added via a previous group.

Next, the process 700 determines whether to check additional groups. First, the process 700 determines (at 745) whether there are any remaining machines to add to the match condition (i.e., whether all of the machines have been removed from the data structure mentioned above). If all of the machines have been added to the match condition, then no additional groups need to be analyzed and the process proceeds to 760, described below.

If any machines remain to be added to the match condition, then the process 700 determines (at 750) whether any groups remain to be analyzed. If there are more groups that could potentially be added to the match condition, the process returns to 730 to select the next group in the order. However, if all groups have been analyzed and there are machines remaining to be added to the match condition, the process creates (at 755) a group for any remaining machines and adds this group to the match condition. If multiple machines remain to be added to the match condition, some embodiments create a single group for all of the machines, while other embodiments create a separate group for each remaining machine. Any newly added groups are also added to the set of existing groups so that these groups can be reused for subsequent match condition updates. For instance, a group used in a source match condition for egress flows might end up being useful in a destination match condition for ingress flows or on either side for intra-application flows.

Figure 9:
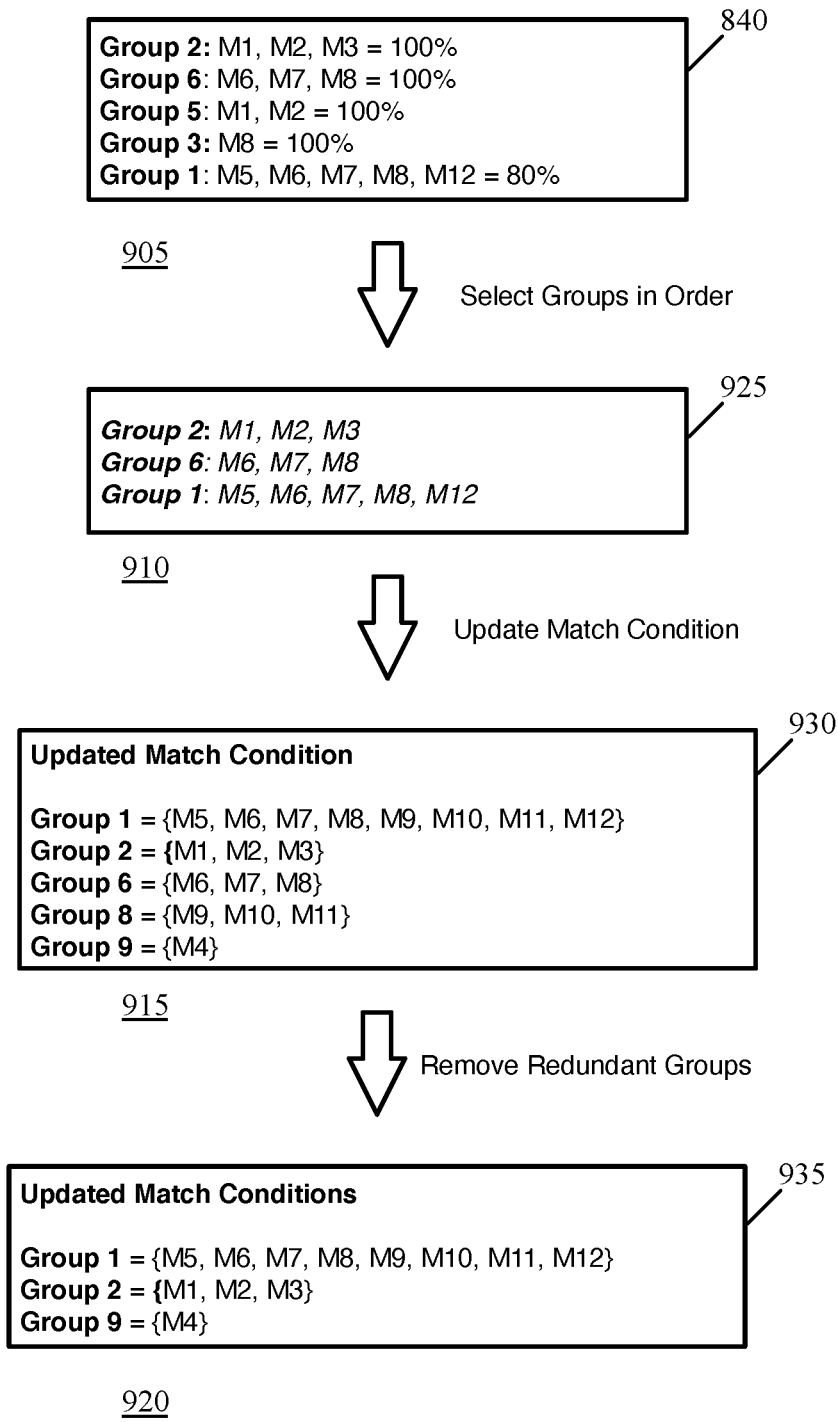

FIG. 9 illustrates, in a first stage 905, the candidate groups 840 from the third stage 815 of FIG. 8. The second stage 910 illustrates the selected groups 925 according to the process 700. In this example, Group 2 is first analyzed and selected for the match condition. Group 6 is analyzed next and also added, because M6, M7, and M8 have not yet been included in the match condition. However, all of the machines in Group 5 and Group 3 have been added to the match condition based on the previous additions of Group 2 and Group 6. Finally, Group 1 is analyzed and added because M5 has not yet been otherwise added to the match condition. The third stage 915 illustrates the updated match condition 930, which includes newly added Groups 1, 2, and 6, the previous Group 8, as well as a newly created Group 9 for machine M4.

Returning to FIG. 7, after updating the match condition with any newly added and newly created groups, the process 700 eliminates (at 760) any redundant groups, then ends. Here, some embodiments check each group in the updated match condition and determine whether there is another group that (i) includes all of its required machines (i.e., machines either newly added or pre-existing in the match condition) and (ii) includes at least one other required machine. In this case, the group with fewer required machines is removed from the recommended match condition to eliminate redundancy. The fourth stage 920 of FIG. 9 illustrates a further updated match condition 935 in which Groups 6 and 8 are both removed because all of their machines {M6, M7, M8} and {M9, M10, M11} are included in Group 1. It should be noted that some embodiments do not allow or do not recommend the removal of any groups that were part of the match condition prior to the modification recommendation process.

FIG. 10 conceptually illustrates an electronic system 1000 with which some embodiments of the invention are implemented. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory (ROM) 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random-access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3, 5, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for modifying a firewall rule of a security policy implemented in a network, the method comprising:
    identifying a set of compute machines to be added to a match condition for the firewall rule, wherein the match condition is expressed using one or more groups of compute machines;
    selecting a set of groups for the identified set of compute machines from a plurality of existing groups of compute machines based on a user-specified threshold indicating tolerance for inclusion of compute machines that are not in the identified set of compute machines in the selected groups; and
    using the selected set of groups for the match condition of the firewall rule;

wherein the user-specified threshold balances use of existing groups against inclusion in the match condition of compute machines that are not in the identified set of compute machines.

2. The method of claim 1, wherein the identified set of compute machines are based on observed flows in a network that do not match the firewall rule.

3. The method of claim 1, wherein a higher threshold excludes groups with fewer compute machines that are not in the identified set of compute machines.

4. The method of claim 1, wherein the set of compute machines is a set of network addresses and each group is a different collection of network addresses.

5. The method of claim 1, wherein using the selected set of groups comprises presenting the selected set of groups as a recommendation to a user for modifications to the match condition for the firewall rule.

6. The method of claim 1, wherein the match condition is one of source addresses of flows and destination addresses of flows.

7. The method of claim 1, wherein the user-specified threshold specifies a minimum percentage of the compute machines in a group that are required to be in the identified set of compute machines for the group to be included in the selected set of groups.

8. The method of claim 7, wherein the selected set of groups comprises, for each compute machine in the identified set of compute machines, at least one group that includes the compute machine unless there are no groups in the plurality of existing groups that include the compute machine.

9. The method of claim 8, wherein selecting the set of groups comprises creating a new group for any compute machines that are not included in any of the existing groups.

10. A non-transitory machine readable medium storing a program which when executed by at least one processing unit modifies a firewall rule of a security policy implemented in a network, the program comprising sets of instructions for:
identifying a set of compute machines to be added to a match condition for the firewall rule, wherein the match condition is expressed using one or more groups of compute machines;
selecting a set of groups for the identified set of compute machines from a plurality of existing groups of compute machines based on a user-specified threshold indicating tolerance for inclusion of compute machines that are not in the identified set of compute machines in the selected groups; and
using the selected set of groups for the match condition of the firewall rule;
wherein the user-specified threshold balances use of existing groups against inclusion in the match condition of compute machines that are not in the identified set of compute machines.

11. The non-transitory machine readable medium of claim 10, wherein the identified set of compute machines are based on observed flows in a network that do not match the firewall rule.

12. The non-transitory machine readable medium of claim 1, wherein a higher threshold excludes groups with fewer compute machines that are not in the identified set of compute machines.

13. The non-transitory machine readable medium of claim 10, wherein the set of compute machines is a set of network addresses and each group is a different collection of network addresses.

14. The non-transitory machine readable medium of claim 10, wherein the set of instructions for using the selected set of groups comprises a set of instructions for presenting the selected set of groups as a recommendation to a user for modifications to the match condition for the firewall rule.

15. The non-transitory machine readable medium of claim 10, wherein the match condition is one of source addresses of flows and destination addresses of flows.

16. The non-transitory machine readable medium of claim 10, wherein the user-specified threshold specifies a minimum percentage of the compute machines in a group that are required to be in the identified set of compute machines for the group to be included in the selected set of groups.

17. The non-transitory machine readable medium of claim 16, wherein the selected set of groups comprises, for each compute machine in the identified set of compute machines, at least one group that includes the compute machine unless there are no groups in the plurality of existing groups that include the compute machine.

18. The non-transitory machine readable medium of claim 17, wherein the set of instructions for selecting the set of groups comprises a set of instructions for creating a new group for any compute machines that are not included in any of the existing groups.

* * * * *